United States Patent
Matsuda

(10) Patent No.: US 11,756,347 B2
(45) Date of Patent: Sep. 12, 2023

(54) STATE MONITORING DEVICE THAT SPECIFIES STATUS OF VEHICLE

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 500 days.

(21) Appl. No.: 16/930,190

(22) Filed: Jul. 15, 2020

(65) Prior Publication Data

US 2021/0019960 A1    Jan. 21, 2021

(30) Foreign Application Priority Data

Jul. 16, 2019 (JP) ................................. 2019-130995

(51) Int. Cl.
| | |
|---|---|
| G07C 5/02 | (2006.01) |
| G07C 5/00 | (2006.01) |
| G07C 5/08 | (2006.01) |
| G01M 15/04 | (2006.01) |
| B60R 16/023 | (2006.01) |

(52) U.S. Cl.
CPC ............ *G07C 5/02* (2013.01); *B60R 16/0232* (2013.01); *G01M 15/04* (2013.01); *G07C 5/006* (2013.01); *G07C 5/008* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 6,542,853 B1 | 4/2003 | Murakami et al. | |
| 9,558,599 B2 * | 1/2017 | Chitty | E02F 9/2054 |
| 11,222,484 B2 * | 1/2022 | Kanbe | G07C 5/008 |
| 2015/0100504 A1 * | 4/2015 | Binion | G06Q 30/0278 |
| | | | 705/306 |
| 2016/0025027 A1 * | 1/2016 | Mentele | F02D 41/22 |
| | | | 701/102 |
| 2016/0133070 A1 * | 5/2016 | Ikeda | G07C 5/0808 |
| | | | 701/31.4 |
| 2018/0158145 A1 * | 6/2018 | Weigel | G06Q 40/06 |
| 2018/0182187 A1 * | 6/2018 | Tong | H04L 12/40 |

FOREIGN PATENT DOCUMENTS

| | | | | |
|---|---|---|---|---|
| EP | 2947447 A1 * | 11/2015 | ......... | G01M 17/007 |
| JP | H11211622 A | 8/1999 | | |
| JP | 2015041304 A | 3/2015 | | |
| WO | WO-2014144036 A1 * | 9/2014 | ............ | F02D 41/22 |

* cited by examiner

*Primary Examiner* — Abdhesh K Jha
(74) *Attorney, Agent, or Firm* — Alleman Hall Creasman & Tuttle LLP

(57) ABSTRACT

This state monitoring device configured to monitor a current state of a vehicle includes: a storage configured to have stored therein a load index which is an index indicating an accumulation degree of a load having occurred in the vehicle; and a calculation unit configured to receive detection values of a plurality of sensors mounted on the vehicle, and configured to perform a predetermined calculation. The calculation unit includes: a status specification section configured to, by using the detection values of the plurality of sensors, specify, out of a plurality of status categories determined in advance and each indicating a status of use regarding running of the vehicle, one or more of the status categories; and an index update section configured to, on the basis of each specified status category, update the load index stored in the storage.

18 Claims, 11 Drawing Sheets

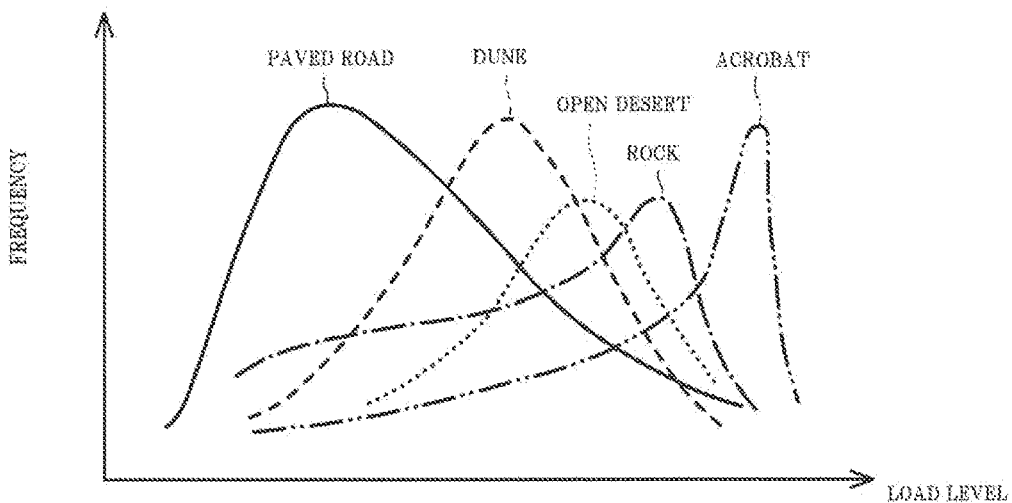

FIG.7

| | ENGINE DRIVE-SYSTEM PORTION $Z_1$ | POWER TRANSMISSION-SYSTEM PORTION $Z_2$ | DAMPING-SYSTEM PORTION $Z_3$ | ... |
|---|---|---|---|---|
| ENVIRONMENT LOAD Y1 | 8 | 7 | 4 | ... |
| HEAT LOAD Y2 | 13 | 20 | 8 | ... |
| REPEATED FATIGUE Y3 | 11 | 17 | 5 | ... |
| IMPACT LOAD Y4 | 0 | 1 | 0 | ... |
| ⋮ | ⋮ | ⋮ | ⋮ | ⋮ |

FIG.8A

| | ENGINE DRIVE-SYSTEM PORTION $Z_1$ | POWER TRANSMISSION-SYSTEM PORTION $Z_2$ | DAMPING-SYSTEM PORTION $Z_3$ | ... |
|---|---|---|---|---|
| ACCUMULATED LOAD VALUE | 32 | 45 | 17 | ... |

FIG.8B

| | ENGINE DRIVE-SYSTEM PORTION $Z_1$ | POWER TRANSMISSION-SYSTEM PORTION $Z_2$ | DAMPING-SYSTEM PORTION $Z_3$ | ... |
|---|---|---|---|---|
| LOAD LEVEL 1 | 9 | 7 | 4 | ... |
| LOAD LEVEL 2 | 8 | 20 | 8 | ... |
| LOAD LEVEL 3 | 4 | 17 | 5 | ... |
| LOAD LEVEL 4 | 2 | 1 | 0 | ... |
| ⋮ | ⋮ | ⋮ | ⋮ | ⋮ |

FIG.8C

STATE MONITORING DEVICE THAT SPECIFIES STATUS OF VEHICLE

CROSS REFERENCE TO RELATED APPLICATION

This application claims priority to and the benefit of Japanese Patent Application No. 2019-130995 filed on Jul. 16, 2019, the entire disclosure of which is incorporated herein by reference.

BACKGROUND OF THE INVENTION

Field of the Invention

The present disclosure relates to state monitoring devices for monitoring the states of vehicles.

Description of the Related Art

JPH11-211622 discloses collecting data of the engine rotational speed and the fuel injection amount of a construction machine, and estimating the life of the engine on the basis of such engine operation parameters.

According to JPH11-211622, when past engine operation statuses are the same, the estimated lives are the same. However, even when past engine operation statuses are the same, the lives of vehicles could be different from each other.

SUMMARY OF THE INVENTION

Therefore, the present disclosure provides a state monitoring device that can accurately estimate accumulation of load for each vehicle.

In order to solve the above problem, a state monitoring device according to a mode of the present disclosure is configured to monitor a current state of a vehicle, and includes: a storage configured to have stored therein a load index which is an index indicating an accumulation degree of a load having occurred in the vehicle; and a calculation unit configured to receive detection values of a plurality of sensors mounted on the vehicle, and configured to perform a predetermined calculation. The calculation unit includes a status specification section configured to, by using the detection values of the plurality of sensors, specify, out of a plurality of status categories determined in advance and each indicating a status of use regarding running of the vehicle, one or more of the status categories, and an index update section configured to, on the basis of each specified status category, update the load index stored in the storage.

According to the state monitoring device, a status category indicating a status of use regarding running of the vehicle is specified once, on the basis of the detection values obtained from the plurality of sensors. That is, from a local event detected by each of the plurality of sensors, an event related to the entirety of the vehicle, i.e., the status of use regarding running of the vehicle, is specified. Since the plurality of sensors are used, the status of use regarding running of the vehicle, which is an upper-order event as compared to a local event that is detected by each sensor, can be accurately estimated.

Further, according to the state monitoring device, the load index is updated by using the status category specified by the status specification section. That is, in consideration of the status of use regarding running of the vehicle by the user, the load accumulated in, for example, the entirety of the vehicle, the load accumulated in, for example, each portion of the vehicle, and the like are updated as the load index. Accordingly, accumulation of the load for each vehicle can be accurately estimated. In addition, for example, when the tendency of the status of use regarding running of the vehicle by the user specified by the status specification section is known, a future load amount that could be accumulated in each portion of the vehicle due to use of the vehicle in the future, and the life of each portion of the vehicle are easily estimated.

The index update section may update the load index stored in the storage, on the basis of the specified status category and the plurality of detection values. Accordingly, accumulation of the load for each vehicle can be more accurately estimated.

The plurality of status categories may include a plurality of running operation categories each indicating a type of a running operation related to a running operation of the vehicle. Accordingly, a load index of the vehicle in consideration of the running operation of the vehicle by the user can be obtained.

The plurality of status categories may include a plurality of running field categories each indicating a type of a field related to a running road on which the vehicle runs. Accordingly, a load index of the vehicle in consideration of the type of the field in which the user runs the vehicle can be obtained.

The plurality of status categories may include a plurality of usage categories each indicating a type of a usage for which the vehicle is used. Accordingly, a load index of the vehicle in consideration of the type of the usage for the vehicle of the user can be obtained.

The plurality of status categories may include a plurality of running operation categories each indicating a type of a running operation related to a running operation of the vehicle, and a plurality of running field categories each indicating a type of a field related to a running road on which the vehicle runs. The status specification section may include a first specification section configured to, by using the detection values of the plurality of sensors, specify a first status category which is the status category of one type of the running operation category and the running field category, and a second specification section configured to, by using the detection values of the plurality of sensors and the first status category specified by the first specification section, specify a second status category which is the status category of another type of the running operation category and the running field category. The index update section may update the load index stored in the storage, on the basis of the detection values of the plurality of sensors, the first status category specified by the first specification section, and the second status category specified by the second specification section. Accordingly, accumulation of the load for each vehicle can be more accurately estimated.

The calculation unit may store, for each status category, a frequency specified by the status specification section, into the storage. For example, a maintenance company of the vehicle can appropriately provide the user with advice such as the maintenance timing of the vehicle, by using this frequency information. In addition, the developer of the vehicle can utilize this frequency information in designing/development in consideration of the status of use of the vehicle.

The index update section may update the load index on the basis of the frequency for each status category. For example, when the user frequently uses the vehicle on paved roads, the load accumulated in the vehicle is small, and when the user frequently uses the vehicle on acrobatic running roads, the load accumulated in the vehicle is increased. Thus, when the frequency of the status of use of the vehicle is taken into consideration when updating the load index, accumulation of the load for each vehicle can be more accurately estimated.

The state monitoring device may further include a data management section configured to record the detection values of the plurality of sensors into the storage, and to delete, from the storage, at least a part of the detection values of the plurality of sensors used in specifying the status category by the status specification section. Accordingly, the proportion of the detection values in the storage capacity of the storage can be reduced.

The load index may include a portion load index which is an index indicating an accumulation degree of a load having occurred in each of portions of the vehicle, the portion load index being set for each of a plurality of portion categories that are determined in advance and that respectively indicate the portions of the vehicle. The index update section may specify one or more portion categories out of the plurality of portion categories, on the basis of the specified status category and the plurality of detection values, may determine the weighted value for each of the specified portion categories, on the basis of the specified status category and the plurality of detection values, and may update, for each portion load index corresponding to the specified portion category, the portion load index by adding the determined weighted value. Accordingly, accumulation of the load can be estimated for each portion of the vehicle, in consideration of the status of use regarding running of the vehicle.

The plurality of portion categories may include at least one of an engine drive-system portion, a power transmission-system portion, a damping-system portion and a steering-system portion, and an electric-drive system portion.

The vehicle may have mounted thereon a vehicle-side communication unit capable of transmitting/receiving information to/from a server-side communication unit mounted on a predetermined server apparatus. The calculation unit may include a vehicle-side controller mounted on the vehicle and a server-side controller mounted on the server apparatus. The vehicle-side controller may control the vehicle-side communication unit to transmit the load index updated by the index update section, from the vehicle to the server apparatus. On the basis of the load index received by the server-side communication unit, the server-side controller may output maintenance information which is information related to maintenance of the vehicle. Accordingly, maintenance information can be managed on the server apparatus side, for each user, or for each vehicle, for example.

The calculation unit may control the vehicle on the basis of the load index. Control of the vehicle according to the degree of the load accumulated in the vehicle can be realized.

The vehicle may have mounted thereon a vehicle-side communication unit capable of transmitting/receiving information to/from a server-side communication unit mounted on a predetermined server apparatus. The storage and the calculation unit may be provided to the server apparatus. This allows use of information of another vehicle obtained by the server apparatus, machine learning using data accumulated in the server apparatus, and the like, in calculation performed in the calculation unit. Thus, when compared with a case where the storage and the controller are provided in the vehicle, update of a calculation logic for the calculation unit, addition of information to be used in calculation by the calculation unit, and the like can be easily performed.

The load index may include a load index set for an electric drive unit including at least one of a motor, a battery, and an inverter. Accordingly, the load of the electric drive unit of the vehicle can be estimated.

The plurality of sensors may include at least two of an engine drive-system sensor, a power transmission-system sensor, and a load-system sensor for a vehicle body. When detection values detected by sensors having different variations are used in specifying a status category, the status of use can be accurately specified.

A state monitoring device according to another mode of the present disclosure is configured to monitor a current state of a vehicle and includes: a storage configured to have stored therein information of the vehicle; and a calculation unit configured to receive detection values of a plurality of sensors mounted on the vehicle, and configured to perform a predetermined calculation. By using the detection values of the plurality of sensors, the calculation unit specifies, out of a plurality of running field categories determined in advance and each indicating a type of a field related to a running road on which the vehicle runs, one or more of the running field categories.

A state monitoring device according to still another mode of the present disclosure is configured to monitor a state of a vehicle and includes: a storage configured to have stored therein a load index which is an index indicating an accumulation degree of a load having occurred in the vehicle; and a calculation unit configured to receive a detection value of a sensor mounted on the vehicle, and configured to perform a predetermined calculation. The calculation unit specifies, by using the detection value of the sensor, a load category determined in advance and indicating a type of a load having occurred in the vehicle, and calculates the load index on the basis of a frequency with which the load category has been specified. Since the frequency with which a load category indicating the type of the load having occurred in the vehicle is specified is used in calculation of the load index, accumulation of the load for each vehicle can be accurately estimated.

The calculation unit may specify, by using the detection value of the sensor, out of a plurality of status categories determined in advance and each indicating a status of use regarding running of the vehicle, one or more of the status categories, for each period determined in advance, may specify the load category for each of the specified status categories, and may store, into the storage, the frequency with which the load category for each status category has been specified. Accumulation of the load for each status of use can be estimated.

The load index may include a portion load index set for each of a plurality of portion categories determined in advance and each indicating a portion of the vehicle, and the calculation unit may calculate the portion load index on the basis of a frequency with which the load category has been specified, for each of the portion categories. Accumulation of the load for each portion of the vehicle can be estimated.

The above object, other objects, features, and advantages of the present disclosure will become more apparent from the detailed description of the preferred embodiment below when taken in conjunction with the accompanying drawings.

BRIEF DESCRIPTION OF THE DRAWINGS

FIG. 7 is an example of a graph showing a relationship between the magnitude of a load having occurred in a certain portion of the vehicle during running of the vehicle shown in FIG. 4, and the frequency of occurrence of the load having the magnitude.

FIG. 8A is a table for describing a load index corresponding to a portion of the vehicle and a load item.

FIG. 8B is a table for describing a load index corresponding to a portion of the vehicle.

FIG. 8C is a table for describing a load index corresponding to a portion of the vehicle and a load item.

DESCRIPTION OF THE PREFERRED EMBODIMENTS

Hereinafter, an embodiment will be described with reference to the drawings.

<Outline of System>

Figure 1:
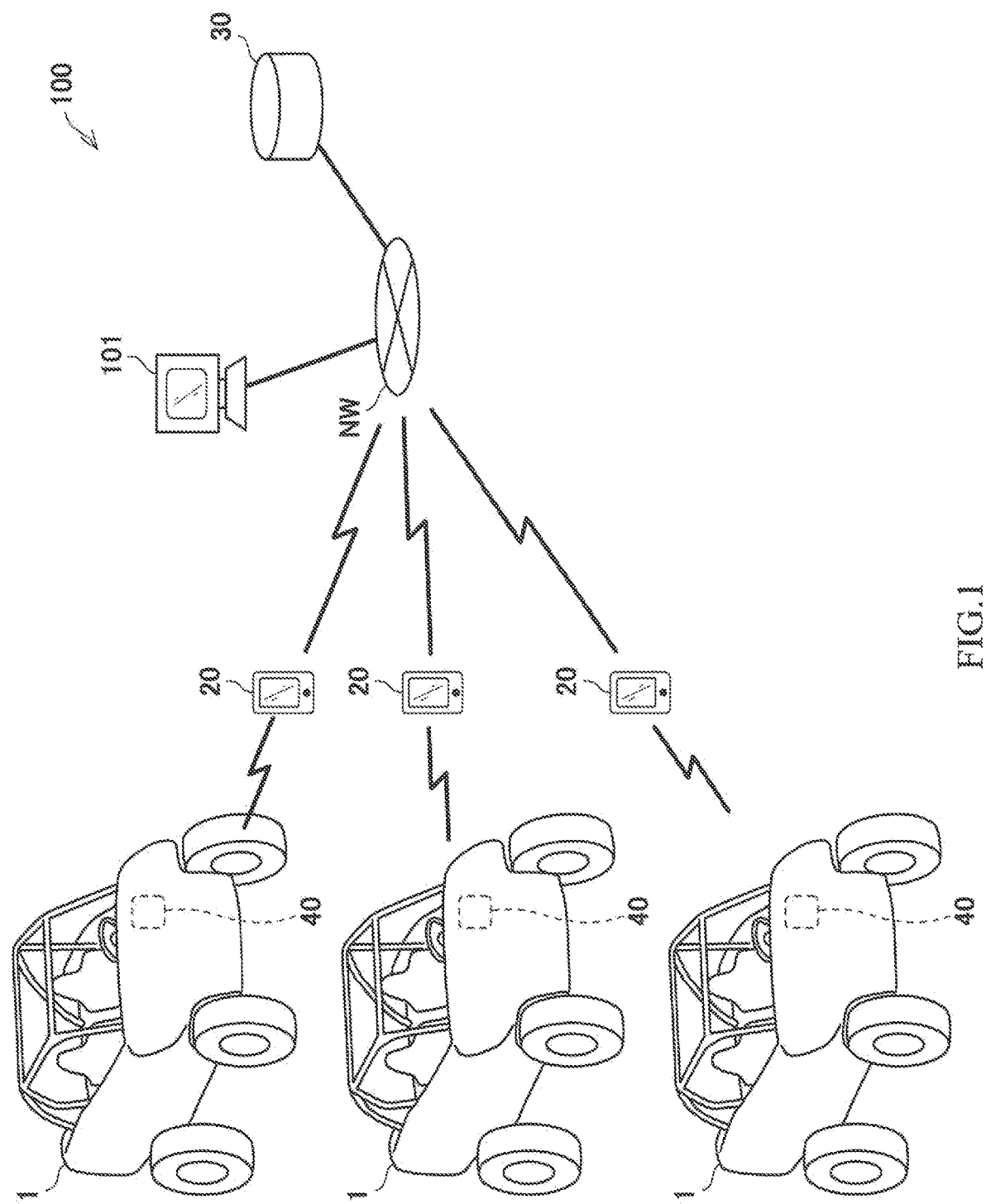
FIG. 1 is a schematic diagram showing a schematic configuration of the entirety of a system including a state monitoring device according to an embodiment.

FIG. 1 is a schematic diagram showing a schematic configuration of a state monitoring system 100 including a state monitoring device according to an embodiment of the present disclosure. For example, a vehicle 1 is an unlevel-ground running vehicle that is used for running on a road surface that is not leveled, i.e., a so-called unlevel ground. In the present embodiment, a utility vehicle is used as an example of the unlevel-ground running vehicle of this type. Such an unlevel-ground running vehicle may run more frequently on uneven road surfaces than a vehicle that runs on level ground. In this case, impacts and the like received by the vehicle 1 from the road surface vary to a large extent, due to influences of a running operation by a driver or of the running road surface on which the vehicle 1 is running. Thus, the lives of components of the same vehicle 1 could differ to a great extent, depending on the status of use. In addition, since the vehicle 1 runs on unlevel ground, a load tolerance in design could momentarily be exceeded to a great extent, for example. In the present embodiment, usage of the vehicle 1 is assumed to be different for each user. For example, the same type of vehicle 1 might be used for carrying burdens for farm work, might be used for hunting, might be used for sports running, or might be used for a plurality of usages among these.

In the present embodiment, a vehicle ECU (Electronic Control Unit) 40 is mounted on each vehicle 1. In the present embodiment, the vehicle ECU 40 functions as a state monitoring device for monitoring the status of use regarding running of the vehicle 1. The vehicle ECU 40 specifies a status of use regarding the running of the vehicle 1 at the time of the detection, on the basis of sensor detection values detected by a plurality of sensors mounted on the vehicle 1.

In the present embodiment, the vehicle ECU 40 specifies a status of use of the vehicle 1, and on the basis of the specified status of use, calculates a load index indicating the accumulation degree of a load having occurred in the vehicle 1, and stores the load index as a calculation result. The status of use and the load index derived by the vehicle ECU 40 can be used as data (hereinafter, referred to as useful data) that will be useful for maintenance of components forming the vehicle 1 and for designing of the structures of components performed by developers.

The vehicle ECU 40 can transmit/receive data to/from a predetermined terminal apparatus 20 provided outside the vehicle 1, through a communication unit 16 (see FIG. 2) mounted on the vehicle 1. For example, the terminal apparatus 20 is an information terminal apparatus carried by an occupant of the vehicle 1. The information terminal apparatus is a smart phone (multi-function mobile phone), for example. The terminal apparatus 20 can transmit/receive data to/from a predetermined server apparatus 30 to which the terminal apparatus 20 is connected via a public line. The useful data stored by the vehicle ECU 40 is transmitted, via the communication unit 16 and the terminal apparatus 20, to the server apparatus 30 provided outside the vehicle 1, and is stored in the server apparatus 30.

The useful data is stored for each predetermined classification in the server apparatus 30. For example, the useful data may be stored in the server apparatus 30, for each vehicle ECU 40 or for each user of the vehicle 1. The useful data may be stored in the server apparatus 30, for each type of the vehicle 1, for each regional group to which the vehicle 1 belongs, or for each user group classified according to a predetermined condition. The useful data stored in the server apparatus 30 may be used as information (for example, information related to maintenance of each portion of the vehicle 1) for supporting the user of the vehicle 1. The useful data stored in the server apparatus 30 may be used as information for development feedback for the developer who developed the vehicle 1.

<Hardware Configuration>

Next, a hardware configuration of the system shown in FIG. 1, specifically, hardware configurations of the vehicle 1, the terminal apparatus 20, and the server apparatus 30 are described with reference to FIG. 2.

(Vehicle)

Figure 2:
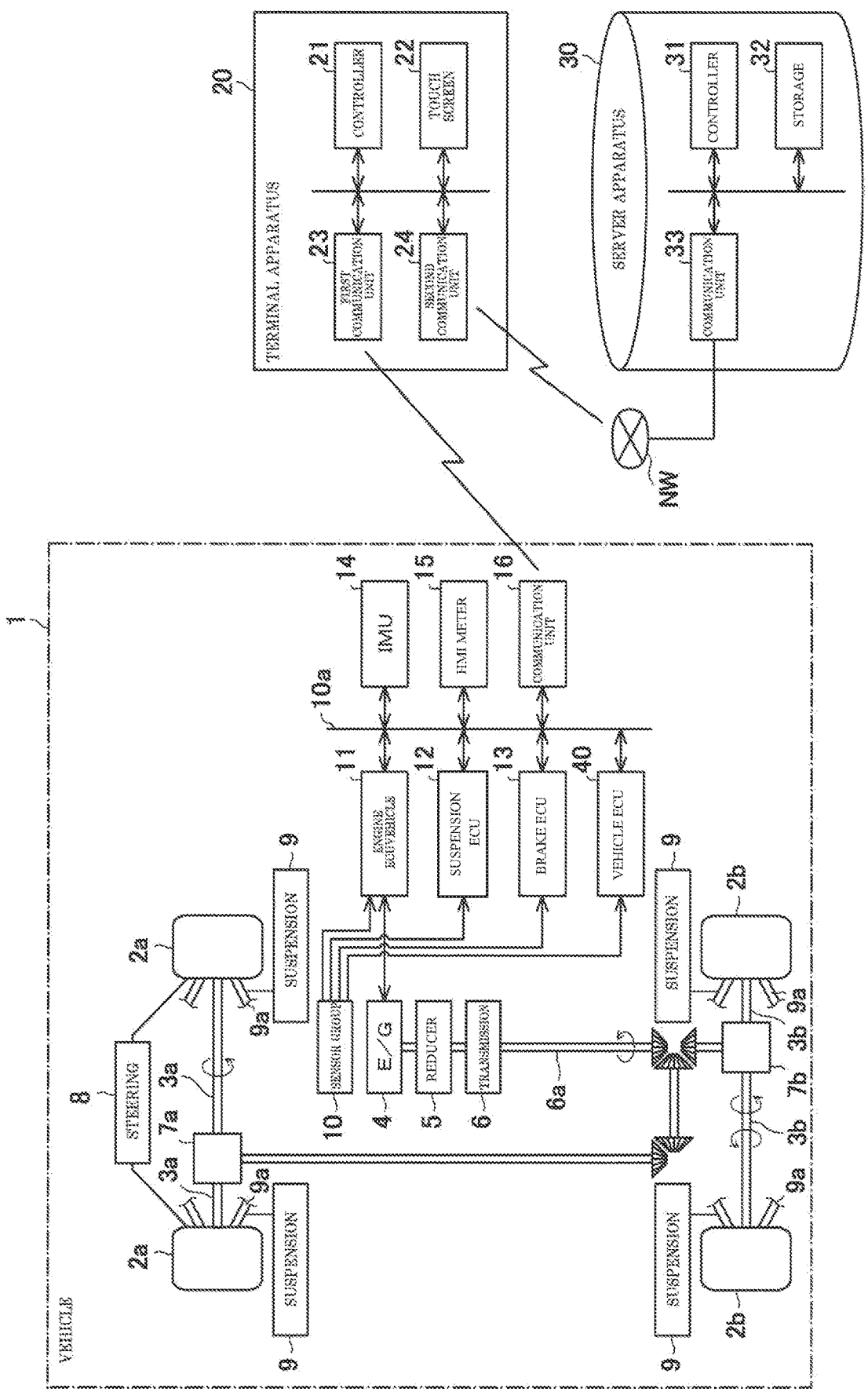
FIG. 2 is a block diagram showing a hardware configuration of the system shown in FIG. 1.

As described above, in the present embodiment, the vehicle 1 is a utility vehicle, and includes a vehicle body frame (not shown in FIG. 2). A pair of right and left front wheels 2a are supported in a front portion of the vehicle body frame. A pair of right and left rear wheels 2b are supported in a rear portion of the vehicle body frame. Each front wheel 2a is provided with a front wheel brake (not shown). Each rear wheel 2b is provided with a rear wheel brake (not shown). A pair of front drive shafts 3a extending in the right-left direction are coupled to the pair of front wheels 2a, respectively. A pair of rear drive shafts 3b extending in the right-left direction are coupled to the pair of rear wheels 2b, respectively.

In addition, the vehicle 1 includes an engine unit, which is a running drive source. The engine unit integrally includes an engine 4, a reducer 5, and a transmission 6, and is supported by the vehicle body frame. The engine 4 is a gasoline engine, for example. The transmission 6 is a belt-type continuously variable transmission, for example. Rotational power of the engine is changed via the reducer 5 and the transmission 6, to be transmitted to an output shaft 6a. The rotational power transmitted to the output shaft 6a is transmitted to the pair of front drive shafts 3a via a front-wheel differential device 7a, and is transmitted to the pair of rear drive shafts 3b via a rear-wheel differential device 7b.

The front-wheel differential device 7a is a mechanism that allows a rotational difference between the pair of front wheels 2a, and the rear-wheel differential device 7b is a mechanism that allows a rotational difference between the pair of rear wheels 2b. The front-wheel differential device 7a and the rear-wheel differential device 7b each have a differential lock function that inhibits allowing of a rotational speed difference, for example. The vehicle 1 has a power transmission switching function capable of changing the number of drive wheels that are rotationally driven by the running drive source. Specifically, a four-wheel drive state in which the front and rear wheels 2a, 2b are each driven and a two-wheel drive state in which only the rear wheels 2b are driven are switchable with each other.

The vehicle 1 includes a steering 8 for changing the traveling direction. The steering 8 includes: a steering wheel provided at the driver's seat; and a steering mechanism that changes the orientation of the front wheels 2a in accordance with rotation of the steering wheel.

The vehicle 1 includes suspensions 9 provided to the respective four wheels 2a, 2b. Each suspension 9 is a damping device that suppresses transmission of unevenness of a road surface to the vehicle body. Each suspension 9 includes: an oscillation arm 9a that supports the wheel 2a, 2b in such a manner as to be able to oscillate with respect to the vehicle body frame; a spring (not shown) that absorbs impact transmitted from the wheel 2a, 2b; and a shock absorber (not shown) that is coupled to the oscillation arm 9a and that attenuates vibration of the spring. For example, the oscillation arm 9a is an upper-side arm of a double wishbone suspension, i.e., a so-called A-arm.

The vehicle 1 has mounted thereon a large number of sensors. In the description below, the large number of sensors mounted on the vehicle 1 are comprehensively referred to as a sensor group 10. For example, detection values detected by the sensor group 10 include: running distance of the vehicle 1; running speed and speed variation of the vehicle 1; rotation speed and speed variation of the running drive source mounted on the vehicle 1; throttle position; gear position; wheel speed and speed variation of each of the front wheels and the rear wheels; speed and speed variation before and after application of the reducer, the continuously variable transmission, the hydraulic clutch, and the like; steering angle and angle variation; suspension stroke (Front Stroke and Rear Stroke) and stroke variation; acceleration in the front-rear direction (front-rear acceleration) of the vehicle 1; acceleration in the right-left direction (lateral acceleration) of the vehicle 1; acceleration in the up-down direction (up-down acceleration) of the vehicle 1, attitude variation in the pitch direction, roll direction, and yaw direction of the vehicle body; brake pressure and pressure variation; and the like.

For example, the sensor group 10 is classified into an engine drive-system sensor, a power transmission-system sensor, and a load-system sensor. The engine drive-system sensor is a sensor that detects a detection amount regarding engine drive. The detection amount regarding the engine drive includes engine rotational speed, throttle opening degree, fuel injection amount, and the like. The power transmission-system sensor is a sensor that detects a detection amount regarding power transmission from the engine 4 to the wheel 2a, 2b. The detection amount regarding the power transmission includes: gear ratio; ON/OFF of a clutch operation; ON/OFF of a differential lock operation; ON/OFF of a drive wheel switching operation; and the like. The load-system sensor is a sensor that detects a detection amount regarding external force related to the vehicle body (the vehicle body frame in the present example). The detection amount regarding the external force related to the vehicle body includes: control amount of a brake operation; vehicle body attitude; stroke variation; and the like. Other than these, the sensor group 10 may include various types of ECUs 11, 12, 13, and the like mounted on the vehicle 1. In this case, detection values of the various types of ECUs 11, 12, 13 are detection amounts according to the control modes determined by the various types of ECUs 11, 12, 13.

In the present embodiment, a status of use regarding running of the vehicle can be estimated on the basis of various detection values detected in the vehicle 1. For example, the status of use regarding running of the vehicle 1 is a running state of the vehicle 1. For example, the status of use regarding running of the vehicle includes at least one of: a status of a running road surface on which the vehicle 1 runs; a status of a running operation of the vehicle 1; and a running status and usage of running of the vehicle 1.

In addition to the vehicle ECU 40 described above, the vehicle 1 has mounted thereon the engine ECU 11, the suspension ECU 12, the brake ECU 13, an IMU 14, an HMI meter 15, and the communication unit 16. The components 11 to 16, 40 are connected to each other by a CAN bus 10*a* so as to be able to transmit data with each other.

In terms of hardware, the vehicle ECU 40, the engine ECU 11, the suspension ECU 12, and the brake ECU 13 each include a processor, a volatile memory, a nonvolatile memory, an I/O interface, and the like. The vehicle ECU 40, the engine ECU 11, and the suspension ECU 12 are each connected to a part or all of the sensors in the sensor group 10. Detection values detected by the sensors are sent to the vehicle ECU 40, the engine ECU 11, and the suspension ECU 12. The vehicle ECU 40 and the other ECUs 11, 12, 13 may be realized by the same hardware, or may be realized by different hardware.

The engine ECU 11 performs electronic control on the engine 4. In the present embodiment, the engine ECU 11 is an FI (Fuel Injection)-ECU that performs electronic control on a fuel injection device provided to the engine 4 mounted on the vehicle 1.

The suspension ECU 12 performs electronic control on the suspension 9. The brake ECU 13 controls braking force to be generated at the front wheel brakes and the rear wheel brakes.

The ECU 11, 12, 13 controls the engine 4 and the vehicle 1 in accordance with a control logic determined in advance. For example, a control for supporting driving, a control for protecting the vehicle 1, and a characteristic change control for changing to a vehicle characteristic according to the preference of the driver are performed. Examples of the control for supporting driving include a traction control for suppressing slippage of the wheel 2*a*, 2*b*, an ABS control for suppressing brake lock, an autocruise control for maintaining a constant speed, and the like. Examples of the control for protecting the vehicle 1 include an engine rotational speed limiter control, a warning control, a catalyst protection control, and the like. Examples of the characteristic change control include: an output characteristic (power mode, economy mode) change corresponding to an operation according to the preference of the driver; a meter indication change control; a suspension expansion/contraction characteristic change, and the like. Information of a control mode executed by the ECU 11, 12, 13 may be added to information for estimating the status of use described above. Accordingly, the accuracy of status estimation can be further improved.

The IMU (Inertial Measurement Unit) 14 is a device that detects angular velocity and acceleration in three axes extending in the front-rear direction, the right-left direction, and the up-down direction of the vehicle 1. This enables determination of the attitude with respect to the three axes of the vehicle 1, and detection of forces that occur in the running vehicle 1, such as accelerating force and decelerating force, centrifugal force, inertial force, impact force at the time of collision with an obstruction, and the like.

The HMI (Human Machine Interface) meter 15 is a device that presents, to the driver of the vehicle 1, detection values of the sensor group 10, values calculated or obtained on the basis of the detection values, and the like.

The communication unit 16 (vehicle-side communication unit) performs wireless communication with a first communication unit 23 of the terminal apparatus 20. For example, the communication unit 16 is formed integrally with the HMI meter 15. The communication unit 16 and the first communication unit 23 are each implemented by an antenna, an RF (Radio Frequency) circuit, and the like. In the present embodiment, the wireless communication performed by the communication unit 16 and the first communication unit 23 is Bluetooth (registered trade mark) communication. The communication unit 16 and the first communication unit 23, by being paired, become able to perform the wireless communication. Pairing denotes performing mutual authentication such that communication can be performed between devices (in the present embodiment, the communication unit 16 and the first communication unit 23) while communication with an irrelevant device nearby is prevented. The communication unit 16 and the first communication unit 23 may be configured to perform wired communication with each other.

(Terminal Apparatus)

In terms of hardware, the terminal apparatus 20 includes a controller 21, a touch screen 22, the first communication unit 23, and a second communication unit 24. These components 21 to 24 are connected to each other so as to be able to transmit data with each other.

The controller 21 controls operation of the terminal apparatus 20. For example, the controller 21 includes an arithmetic processing unit (CPU: Central Processing Unit), a ROM (Read Only Memory), a RAM (Random Access Memory), and the like.

The touch screen 22 serves as an input unit that receives an operation input from a user, and as a display unit that displays a screen that can be viewed by the user. Specifically, the touch screen 22 includes, as the display unit, a semi-transmissive-type display and a back light LED. The touch screen 22 includes, as the input unit, a touch panel provided on the display. The input unit and the display unit of the terminal apparatus 20 may not necessarily be integrated with each other, and may be provided as separate bodies.

The first communication unit 23 performs wireless communication with the communication unit 33 provided on the vehicle 1. Since the first communication unit 23 has a configuration similar to that of the communication unit 16, description thereof is omitted.

The second communication unit 24 performs data communication with a communication unit 33 of the server apparatus 30 via a network NW through wireless communication.

(Server Apparatus)

In terms of hardware, the server apparatus 30 includes a controller 31, a storage 32, and the communication unit 33. These components 31 to 33 are connected to each other so as to be able to transmit data to each other.

The controller 31 (server-side controller) controls operation of the server apparatus 30. The controller 31 includes, for example, an arithmetic processing unit such as a CPU. The storage 32 includes, for example, nonvolatile memories such as a hard disk, a ROM, and the like, and a volatile memory such as a RAM. For example, data sent from the vehicle ECU 40 via the terminal apparatus 20 is stored in the storage 32. The communication unit 33 (server-side communication unit) communicates with the first communication unit 23 of each terminal apparatus 20 via the network NW.

The communication unit 33 stores a load index received from the vehicle 1, into the storage 32.

<Configuration of Vehicle ECU>

Next, a specific configuration of the vehicle ECU 40 is described with reference to FIG. 3.

In terms of hardware, the vehicle ECU 40 includes a controller 41 (vehicle-side controller), a storage 42, a receiver 43, and a CAN communication unit 44. The controller 41 controls operation of the vehicle ECU 40. For example, the controller 41 includes a processor, and memories such as a ROM, a RAM, and the like. For example, the storage 42 includes nonvolatile memories such as a hard disk, a flash memory, a ROM, and the like. As described later, the load index of the vehicle 1 is stored in the storage 42. The receiver 43 is an interface that receives detection values from the sensor group 10. The CAN communication unit 44 is an interface that transmits/receives signals to/from the above-described other elements through the CAN bus 10a described above. Accordingly, information from other devices connected according to the CAN communication standard can be obtained. In the present embodiment, the various types of ECUs 11, 12, 13, 40 are configured to be able to transmit information with each other through CAN communication.

Figure 3:
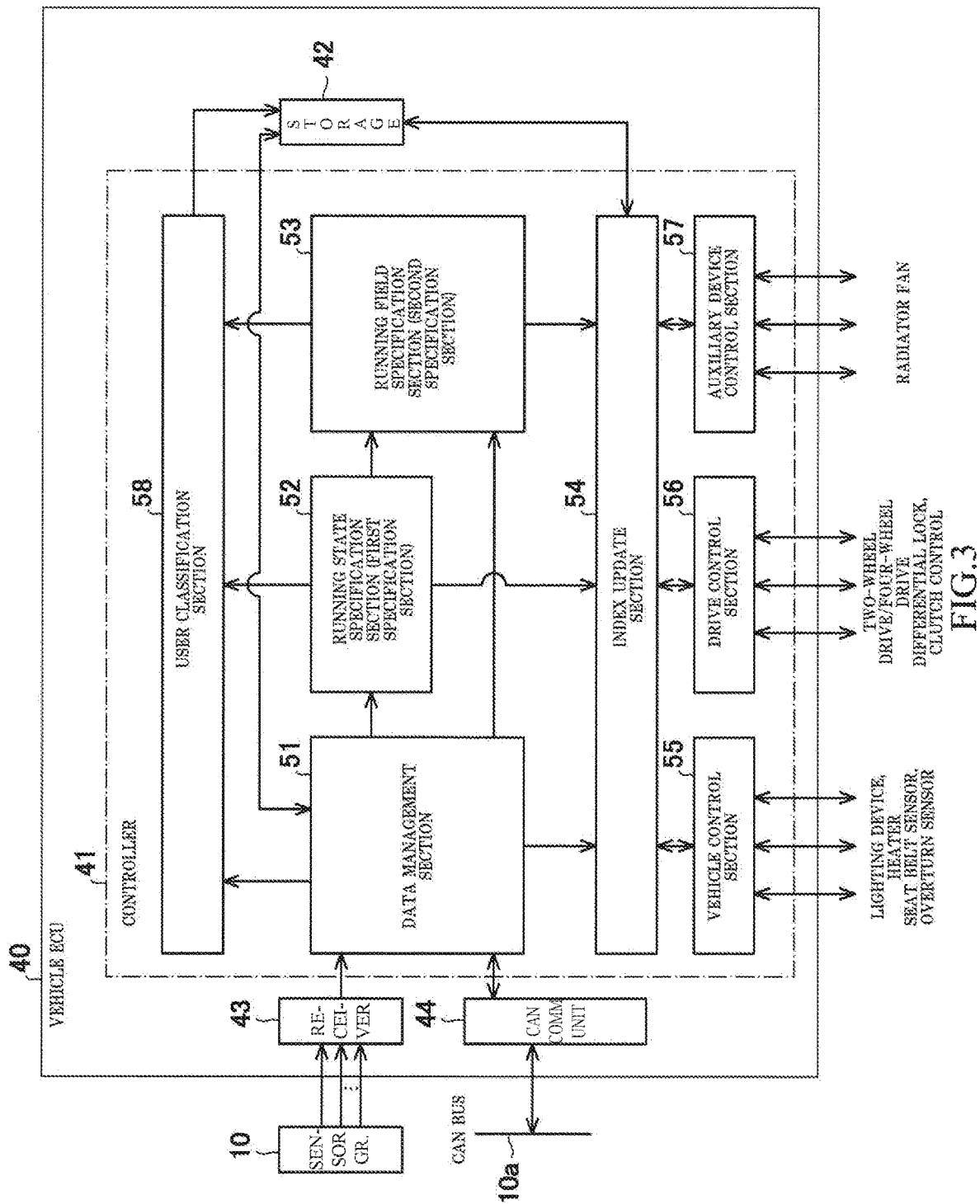
FIG. 3 is a block diagram showing a vehicle ECU shown in FIG. 2.

FIG. 3 also shows a functional configuration of the controller 41 of the vehicle ECU 40. In the present embodiment, the controller 21 corresponds to a "calculation unit" in the present disclosure. In terms of functionality, the controller 41 includes a data management section 51, a running state specification section 52, a running field specification section 53, an index update section 54, a vehicle control section 55, a drive control section 56, an auxiliary device control section 57, and a user classification section 58. For example, a state monitoring program is stored in a nontransitory storage medium (Non-transitory computer readable medium) such as a nonvolatile storage device of the vehicle ECU 40, e.g., a nonvolatile memory of the controller 41 and/or the storage 42. These functional sections 51 to 58 are realized by the processor of the controller 41 executing the state monitoring program.

The data management section 51 records, into the storage 42, detection values received from the receiver 43 and the CAN communication unit 44.

In the present embodiment, the data management section 51 temporarily records the received detection values into the storage 42, and then, deletes, from the storage 42, at least a part of detection values of a plurality of sensors used in specifying a status category by each of the running state specification section 52 and the running field specification section 53 described later. For example, the data management section 51 deletes detection values of a plurality of sensors after the detection values of the plurality of sensors have been used in generation of useful data, as described later. The data management section 51 may perform deletion of detection values of a plurality of sensors at a time interval determined in advance.

In the present embodiment, the detection values received by the data management section 51 are used in specifying a status of use of the vehicle 1 and in updating the load index. That is, the detection values received by the data management section 51 in the present embodiment correspond to "detection values of a plurality of sensors" in the present disclosure.

Not only the detection values received by the vehicle ECU 40 from the sensor group 10, but also a detection value obtained by the vehicle ECU 40 from the IMU 14, and values obtained by the vehicle ECU 40 from other ECUs 11, 12, 13 (values and the like calculated by the ECUs on the basis of the detection values received from the sensor group 10) are also included in the "detection values of a plurality of sensors" of the present disclosure.

However, in addition to the detection values received by the data management section 51, information provided to the vehicle control section 55, the drive control section 56, and the auxiliary device control section 57 described later, and control command information outputted by the control sections 55 to 57 may also be included in the "detection values of a plurality of sensors" to be used in specifying a status of use of the vehicle 1 and in updating the load index. For example, since information of a seat belt sensor allows understanding of the number of persons in the vehicle 1, the information of a seat belt sensor can be information that could influence the load on the vehicle 1. For example, information of an overturn sensor could be information closely related to a fact that a large impact has been applied to the vehicle 1 due to overturn of the vehicle 1. For example, operation information of a radiator fan or an air conditioner could be information closely related to the degree of thermal fatigue of the engine drive system.

Preferably, detection values from the respective sensors received by the data management section 51 are obtained as mutually corresponding data so as to allow recognition that the detection values are detection values that have been detected under the same status. For example, each detection value may be associated with time information indicating the day and time of the detection. This allows recognition that the plurality of detection values are detection values that have been detected under the same status. Not limited to these, with respect to detection values from a plurality of different sensors, reference information for allowing recognition that the detection values are detection values obtained under the same status may be associated with the respective detection values. The reference information may be information indicating the obtainment timing, or may be information that is set using a clock frequency set to the various types of ECUs.

The running state specification section 52 (first specification section) and the running field specification section 53 (second specification section) form a status specification section that specifies, by using received detection values, one or more status categories out of a plurality of status categories determined in advance and each indicating a status of use regarding running of the vehicle 1. The status categories include a running operation category, and a running field category, for example. In the description below, the running operation category and the running field category may be collectively referred to as a status category.

The running state specification section 52 specifies, by using received detection values, one or more running operation categories out of a plurality of running operation categories (first status category) determined in advance as the status category. Each running operation category indicates the type of running operation of the vehicle 1. The plurality of running operation categories include categories regarding operations (a1) to (a8) below, for example.

(a1) acceleration operation,
(a2) deceleration operation,
(a3) constant speed running operation,
(a4) braking operation,
(a5) speed changing operation,
(a6) turning operation,
(a7) lighting operation,
(a8) running mode switching operation (switching operation between two-wheel drive and four-wheel drive, switching operation between actuation and cancelation of the differential device 7a, 7b, ABS (Antilock Brake System) setting, output mode switching operation of the engine 4, mode switching operation of the suspension 9)

In addition to or instead of these running operation categories, the running state specification section 52 may specify a running state category indicating the type of the state of the vehicle 1. For example, in the present embodiment, the running state specification section 52 determines whether the state of the vehicle 1 is in a running state among (c1) general-purpose running state, (c2) unlevel ground running state, and (c3) abnormal running state. For example, the running state specification section 52 specifies a running state category by using values obtained from vehicle sensors such as the IMU 14, a wheel rotation sensor, a suspension stroke sensor, and the like. The general-purpose running state is a state that occurs irrespective of whether the road surface on which the vehicle 1 runs is level ground or unlevel ground. The unlevel ground running state is a running state that frequently occurs when the vehicle 1 runs on unlevel ground. The abnormal running state is a running state that occurs when abnormality has occurred to the vehicle 1. The categories for these states of (c1) to (c3) can be further subdivided as follows.

The (c1) general-purpose running state includes (c11) vehicle acceleration/deceleration state, (c12) slope running state, (c13) high speed running state, (c14) medium speed running state, (c15) low speed running state, (c16) turning running state, (c17) backward running state, (c18) high load running state, (c19) speed changing state, and the like. The "high speed running state" is a state where the speed of the vehicle 1 is maintained at a speed not less than a predetermined first speed. The "medium speed running state" is a state where the speed of the vehicle 1 is maintained at a speed less than the first speed and not less than a predetermined second speed which is less than the first speed. The "low speed running state" is a state where the speed of the vehicle 1 is maintained at a speed less than the second speed. Information regarding a sensor measurement target such as a vehicle speed sensor, the IMU 14, or the like may be used as the information for identifying whether or not the state is the general-purpose running state.

The (c2) unlevel ground running state (this could be referred to as a non-ground-contacting-wheel state) includes (c21) got-caught-on state (e.g., a state where the vehicle has got caught on a rock or the like), (c22) one-side wheel running state, (c23) jump state, (c24) fallen state, (c25) less-contact running state (a state where at least one wheel is not in contact with the road surface as when passing through a dent), (c26) stuck state (a state where the drive wheels slip and the vehicle does not advance), and the like. The got-caught-on state, the one-side wheel running state, the jump state, and the like can be estimated on the basis of detection values of the IMU 14 and a stroke sensor provided for each wheel. The less-contact running state and the stuck state can be estimated on the basis of output values of a plurality of wheel speed sensors.

The (c3) abnormal running state (this could be referred to as a running state where an impact has occurred) includes (c31) collision with an obstruction, (c32) bumping between vehicles, (c33) overturn state, (c34) state where an impact or load on the vehicle 1 exceeds a predetermined value, and the like. These abnormal running states can be estimated on the basis of detection values of the IMU 14. For example, with respect to a category for a running state, detection values in known states of the category may be obtained in advance, and a correlation between the detection values in various states may be obtained. Accordingly, various states included in the running state category can be grasped on the basis of the detection values and the correlation obtained in advance.

Preferably, the running state specification section 52 can simultaneously specify two or more states out of the plurality of states described above, as the current state of the vehicle 1. In addition, preferably, the running state specification section 52 can specify the state of the vehicle 1 at a short time interval so as to be able to identify that the state of the vehicle 1 has shifted.

The running field specification section 53 (second specification section) specifies, by using detection values of the sensor group 10, one or more running field categories out of a plurality of running field categories (second status category) determined in advance as the status category. Each running field category indicates the type of the road surface state related to the running road on which the vehicle 1 runs. As described above, when the vehicle 1 runs on unlevel ground, the road surface state of the running road surface differs depending on the region where the vehicle 1 runs. In the present embodiment, the plurality of running field categories include categories for the fields indicated in (b1) to (b5) below, for example.

(b1) paved road,
(b2) dune,
(b3) open desert,
(b4) rock section,
(b5) acrobat field The "paved road" has a road surface having been leveled and having relatively small unevenness. The "dune" is sand dune. The "open desert" is a vast waste land/desert formed of rocks and gravel (sand and pebbles). The "rock section" is a field where rocks and stones of several-ten centimeters are present, for example. The "acrobat field" is a field for acrobatic running, and is a field where a jump board or the like for the vehicle 1 to jump is set, for example. Other than these, the plurality of running field categories may include a field that does not correspond to any of (b1) to (b5), such as "mud", "in forest", "mountain", "waterway crossing", or the like. For example, with respect to a category for a road surface state, detection values in known states of the category may be obtained in advance, and a correlation between the detection values in various states may be obtained. Accordingly, various states included in the road surface state category can be grasped on the basis of the detection values and the correlation obtained in advance. For example, a running state in a rock section may be determined when a rock section condition determined in advance, such as a large cyclic attitude variation of the vehicle body and a relatively low running speed, the frequency of execution of a traction control mode, and the like, is satisfied. A running state in a rock section may be determined when a driving operation condition that satisfies a running condition in a rock section is additionally satisfied. Accordingly, the estimation accuracy can be further enhanced.

The plurality of running field categories may not necessarily be the types of the road surface states, such as (b1) to (b5) described above, and may be categories indicating the types of statuses caused to the vehicle 1 in accordance with the running road surfaces. For example, in addition to or instead of the categories shown in (b1) to (b5), the plurality of running field categories may include (d1) suspension load field, (d2) drive wheel load field, (d3) impact field, (d4) engine high temperature field, and the like.

The (d1) suspension load field is a field where the suspension stroke amount or the stroke speed is relatively greater than that in other fields. The suspension load field corresponds to (b3), (b4), (b5), or the like described above, for example.

The (d2) drive wheel load field is a field where idling of a wheel, such as slip, stuck, or the like, relatively easily occurs, when compared with that in other fields. The drive wheel load field corresponds to (b2), (b3), (b4), or the like described above, for example.

The (d3) impact field is a field where a wheel receives, from the road surface, an impact of a magnitude not less than that determined in advance, such as when collision with an obstruction has occurred, the vehicle 1 has jumped, or the like. The impact field corresponds to (b3), (b4), (b5), or the like described above, for example.

The (d4) engine high temperature field is a field where the engine 4 mounted on the vehicle 1 easily reaches a relatively high temperature than other fields. For example, the engine high temperature field is a field where sending air to a radiator is easily hindered, such as sand dune, mud, grassland, or the like. The engine high temperature field corresponds to (b1), (b2), or the like described above.

The categories listed above are merely examples. That is, the plurality of running operation categories may not necessarily include a part of the categories, or may include a category other than the above-described categories. For example, the running state category may include a state where running is not performed (a state where the vehicle 1 is not driven). For example, the running state specification section 52 may, by using receive detection values, specify either a category indicating that the vehicle 1 is running, and a category indicating that the vehicle 1 is not running. The plurality of running field categories may not necessarily include a part or all of the categories described above, or may include a category other than those described above.

On the basis of the specified status category and a plurality of detection values, the index update section 54 updates the load index stored in the storage 42. In the present embodiment, the index update section 54 updates the load index stored in the storage 42, on the basis of detection values of a plurality of sensors, the running operation category specified by the running state specification section 52, and the running field category specified by the running field specification section 53.

Here, a method for specifying a status category by each of the running state specification section 52 and the running field specification section 53, and update of the load index using the specified status category are described with reference to the drawings.

(Specification of Status Category)

First, specification of a status category is described with reference to FIGS. 4, 5A, 5A, 5B, 5C, 6A, 6B, 6C.

Figure 4:
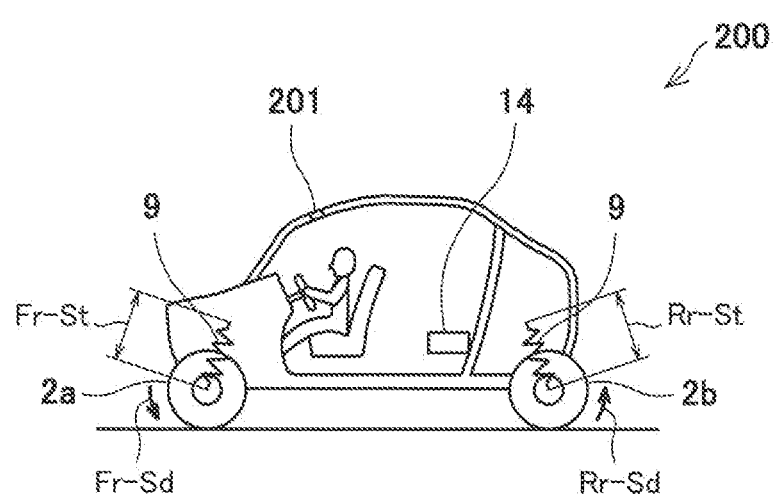
FIG. 4 is a schematic side view of a vehicle caused to run in order to obtain data necessary for development of the vehicle ECU.

For specifying a status category, it is necessary to grasp the correspondence relationship between a part or all of various detection values received by the vehicle ECU 40, and the status categories described above. FIG. 4 is a schematic side view of a vehicle 200 that is caused to run in order to obtain necessary data for grasping the correspondence relationship. Similar to the vehicle 1, the vehicle 200 shown in FIG. 4 is provided so as to be able to obtain information for status estimation. For example, similar to the vehicle 1, the vehicle 200 includes a sensor group 10 of various sensors, the IMU 14, and the like. For example, as shown in FIG. 4, by using various sensors such as the sensor group 10, the IMU 14, and the like, various detection data are obtained during running of the vehicle 200. The various detection data include, for example, a stroke Fr-St (Front Stroke) of the suspension 9 provided to a front wheel 2a, a stroke Rr-St (Rear Stroke) of the suspension 9 provided to a rear wheel 2b, a rotation speed Fr-Sd (Front Speed) of the front wheel 2a, a rotation speed Rr-Sd (Rear Speed) of the rear wheel 2b, and the like.

Figure 5A:
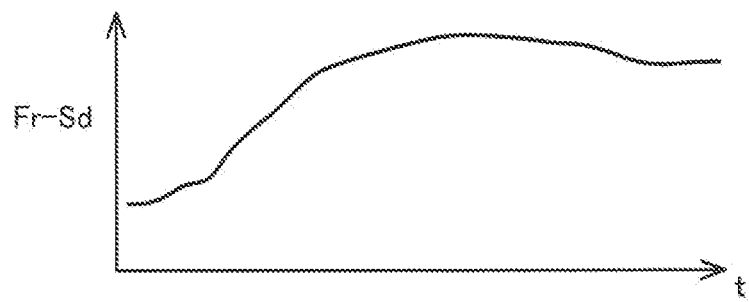
FIG. 5A is an example of temporal transition of the rotation speed of a front wheel during running of the vehicle shown in FIG. 4.
Figure 5B:
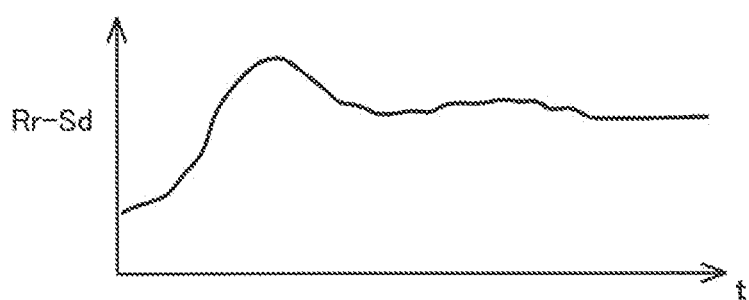
FIG. 5B is an example of temporal transition of the rotation speed of a rear wheel during running of the vehicle shown in FIG. 4.
Figure 5C:
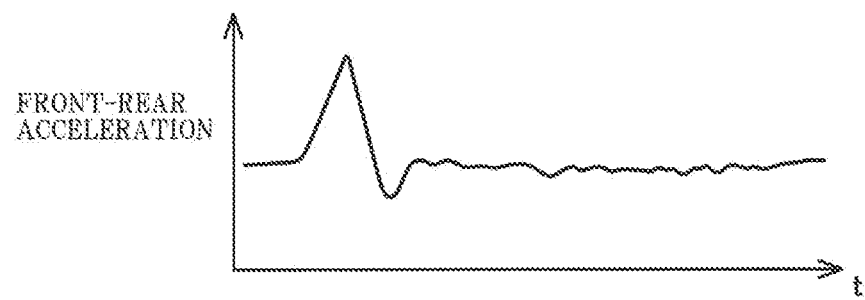
FIG. 5C is an example of temporal transition of the front-rear acceleration of the vehicle during running of the vehicle shown in FIG. 4.

FIG. 5A shows an example of temporal change of the rotation speed (Fr-Sd) of the front wheel 2a during running of the vehicle 200. FIG. 5B shows an example of temporal change of the rotation speed (Rr-Sd) of the rear wheel 2b during running of the vehicle 200. FIG. 5C shows an example of temporal change of the front-rear acceleration of the vehicle 200 during running of the vehicle 200.

Different from the vehicle 1, the vehicle 200 also includes a plurality of load detectors 201 for obtaining load correspondence information described later. In FIG. 4, for simplification of the drawing, one load detector 201 is shown. The plurality of load detectors 201 measure loads applied on portions of the vehicle 200. The load detectors 201 are, for example, a strain gauge for detecting mechanical load/fatigue, an acceleration sensor for detecting a mechanical impact, a temperature sensor for detecting thermal load/fatigue, and the like.

Various detection data (detection values) obtained during running of the vehicle 200 as shown in FIGS. 5A, 5B, 5C are stored in association with the status of use of the vehicle 200. For example, detection data obtained while the vehicle 200 is running on a paved road is stored (while being labeled) in association with information indicating that the running field is a paved road. For example, detection data obtained when a braking operation has been performed on the vehicle 200 is stored in association with information that indicates the braking operation.

Using various detection values and information indicating the status of use of the vehicle 200 which are stored in association with each other, information (hereinafter, referred to as "status correspondence information") indicating the correspondence relationship between a part or all of the various detection values and the status category is created.

The status correspondence information may be in any form. For example, sensor detection values to be used for specifying one status category may include detection values measured at different times by the same sensor. That is, for specifying a status category, temporal change of detection values of one or a plurality of sensors may be used.

For example, the status correspondence information may be the pattern of various detection values (temporal change of a detection value especially related to running, temporal change of a detection value especially related to a driving operation, or the like) during running in various running fields. For example, the running field specification section 53 may estimate a field of the accrual running by comparing temporal change (running/operation pattern) of actual various detection values with temporal change of various detection values for each running field stored in advance. For example, the running field specification section 53 may determine that the running field is a rock section when the pattern of stroke variation of the suspension stroke during running indicates a variation that is characteristic of a rock section. For example, the running field specification section 53 may determine that the surface is a dune road surface when temporal change of a certain detection value is similar to temporal change that is observed when inclined running of the vehicle 1 continues. Meanwhile, for example, it is known that a driver performs driving operations appropriated for various running road surfaces. Thus, the running field specification section 53 may determine a running road surface on the basis of the running status and a driving operation pattern (temporal change of a detection value related to a driving operation) according to the running road surface. For example, for the vehicle 1 running in an acrobat field, the driver performs a driving operation characteristic of the acrobat field, such as performing an acceleration operation before the vehicle 1 jumps. Thus, running in an acrobat field may be determined by determining that a driving operation characteristic of an acrobat field has been performed. The running field specification section 53 may estimate a running road surface by comparing patterns of various detection values with patterns prepared in advance.

Figure 6A:
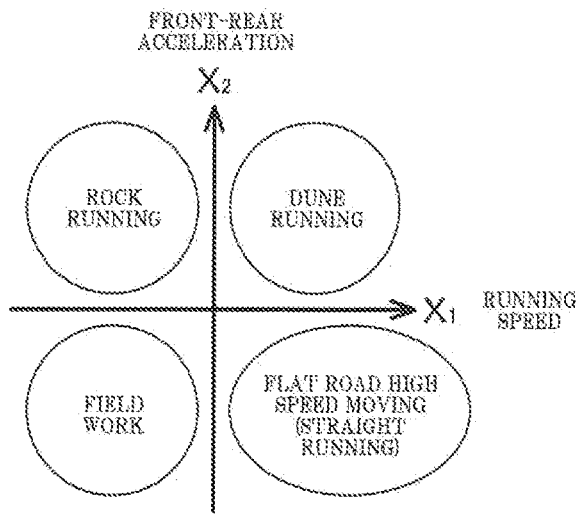
FIG. 6A is a reference map describing regions of status categories corresponding to various detection values, with the horizontal axis representing running speed and the vertical axis representing front-rear acceleration.
Figure 6B:
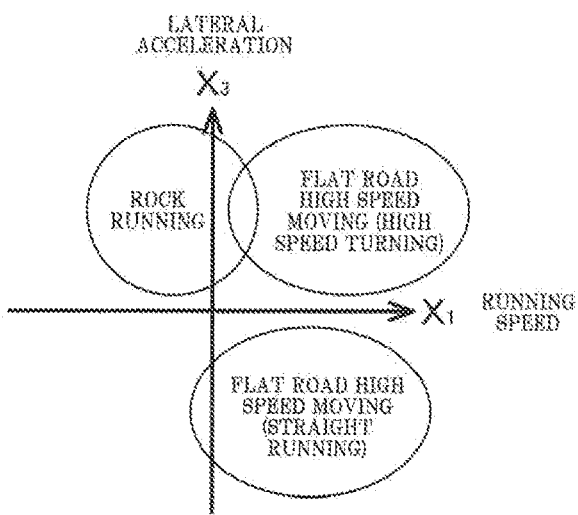
FIG. 6B is a reference map describing regions of status categories corresponding to various detection values, with the horizontal axis representing running speed, and the vertical axis representing lateral acceleration.
Figure 6C:
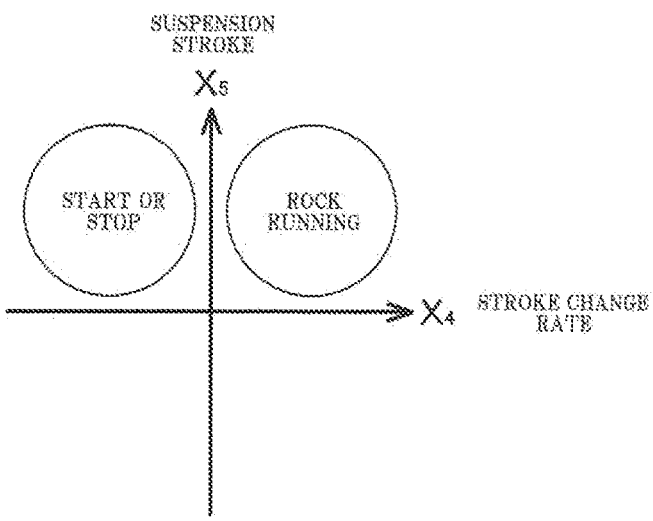
FIG. 6C is a reference map describing regions of status categories corresponding to various detection values, with the horizontal axis representing suspension stroke change rate and the vertical axis representing suspension stroke amount.

For example, the status correspondence information may be created as a reference map indicating a correspondence relationship between a part or all of various detection values and one or more status categories. FIGS. 6A, 6B, 6C are reference maps that define regions of status categories corresponding to various detection values. FIG. 6A is a reference map in which the horizontal axis and the vertical axis respectively represent running speed X1 and front-rear acceleration X2 among detection values of the sensor group 10. FIG. 6B is a reference map in which the horizontal axis and the vertical axis respectively represent running speed X1 and lateral acceleration X3 among detection values of the sensor group 10. FIG. 6C is a reference map in which the horizontal axis and the vertical axis respectively represent suspension stroke change rate X4 and suspension stroke amount X5 among detection values of the sensor group 10. The stroke change rate may be the stroke speed.

In FIGS. 6A, 6B, 6C, regions corresponding to a part of running operation categories and running field categories that correspond to various detection values are shown. The correspondence relationship between detection values from sensors and running operation categories, and the correspondence relationship between detection values from sensors and running field categories, shown as examples in FIGS. 6A, 6B, 6C, are stored in the storage 42 of the vehicle ECU 40 in advance as the status correspondence information. On the basis of this status correspondence information, the status specification section specifies a status category corresponding to obtained detection values of a plurality of sensors. Specifically, the running state specification section 52 and the running field specification section 53 specify, by using the status correspondence information stored in advance, a running operation category and a running field category on the basis of detection values obtained by the data management section 51.

FIGS. 6A, 6B, 6C are simply shown in a two-dimensional coordinate system so as to facilitate understanding of the concept of the method for specifying a status category. In actuality, one status category or a plurality of status categories (running operation category, running field category, and the like) are specified, not on the basis of two detection values, but on the basis of detection values of a large number of sensors. That is, the reference map as the status correspondence information may be a multidimensional map. Basically, the greater the number of sensor detection values to be used is, the more improved the accuracy of specifying the status category is. For example, the running field specification section 53 may specify (estimate) a running road surface by using a detection value having a low relevance to running of the vehicle 1, together with a detection value having a high relevance to running of the vehicle 1. For example, the running field specification section 53 can further accurately estimate a running road surface by using the ambient temperature, the ambient atmospheric pressure, the position information of the vehicle, and the like.

For specifying the status category, machine learning may be used, for example. That is, the status correspondence information may be, for example, a learned neural network obtained through machine learning that uses detection values of various sensors obtained by causing the vehicle 200 shown in FIG. 4 to run. Machine learning for obtaining a learned neural network as the status correspondence information will be described later in detail.

(Relationship Between Status of Use of Vehicle and Load Accumulated in Vehicle)

Next, before update of the load index is described, a relationship between the status of use of the vehicle and the load accumulated on portions of the vehicle is described with reference to FIGS. 5D, 7, 8.

Figure 5D:
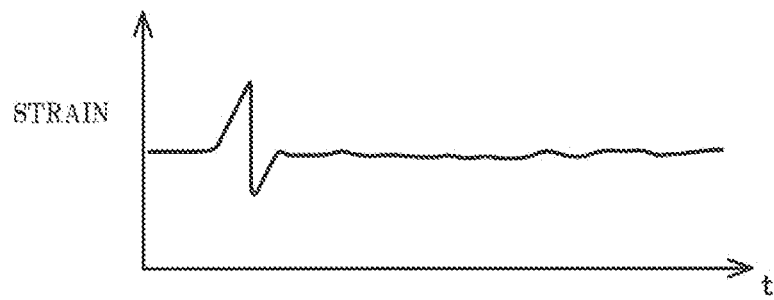
FIG. 5D is an example of temporal transition of the measurement value of a strain gauge during running of the vehicle shown in FIG. 4.

FIG. 5D is an example of temporal transition of the measurement value of a strain gauge as a load detector 201 during running of the vehicle 200. The load data obtained during running of the vehicle 200 as shown in FIG. 5D is stored in association with values detected by various sensors such as the sensor group 10, the IMU 14, and the like, and information about the status of use of the vehicle 200.

FIG. 7 shows an example of a graph indicating a relationship between the magnitude (load level) of the load that has occurred in a portion of the vehicle 200, e.g., the vehicle body frame, during running of the vehicle 200 shown in FIG. 4, and the frequency of occurrence of the load having that magnitude. In this graph, the relationship between the magnitude and the frequency of load (for example, stress) is shown for each field where the vehicle 200 has run.

As seen from FIG. 7, the relationship between the magnitude and the frequency of load is different depending on the field where the vehicle 200 runs. As shown in FIG. 7, for example, when the vehicle 200 runs on a paved road, the frequency of occurrence of a relatively low load in the vehicle body frame is high, and the frequency of occurrence of a relatively high load in the vehicle body frame is low. Meanwhile, for example, when the vehicle 200 runs in an acrobat field, the frequency of occurrence of a relatively high load in the vehicle body frame is high, and the frequency of occurrence of a relatively low load in the vehicle body frame is low.

Similarly, although not shown, the relationship between the magnitude and the frequency of load is also different depending not only on the running field but also on an operation performed to the vehicle 200. Although the relationship between the magnitude and the frequency of load shown in FIG. 7 is about the vehicle body frame of the vehicle 200, the relationship between the magnitude and the frequency of load is different depending on the portion of the vehicle 200. Thus, there is a close relationship between the tendency of the status of use of the vehicle and the tendency of the load that occurs in each portion of the vehicle. In the present embodiment, this relationship is used in estimation of the accumulation degree of the load in the vehicle 1. That is, in the present embodiment, a load index serving as an index indicating the accumulation degree of the load that has occurred in the vehicle 1 is calculated in consideration of the status of use regarding running of the vehicle 1 by the user, whereby the accumulation of the load for each vehicle 1 can be accurately estimated. In addition, as described later, in the vehicle 1, a load index for each portion can be estimated on the basis of detection values of various sensors that do not directly detect loads, for example. Thus, a load of each portion of the vehicle 1 can be estimated, without provision of the load detectors 201 in the vehicle 200.

(Update of Load Index)

Next, update of the load index by the index update section 54 is described with reference to FIG. 8A.

The load index is an index indicating the accumulation degree (degree of fatigue) of the load that has occurred in the vehicle 1. The load index includes a portion load index which is an index indicating the accumulation degree of the load that has occurred in a portion of the vehicle 1. The portion load index is set for each of a plurality of portion categories that are determined in advance and that respectively indicate portions of the vehicle 1.

The index update section 54 updates the (portion) load index every period determined in advance. The period determined in advance may not necessarily be a fixed period.

For example, every time the receiver 43 receives detection values, the index update section 54 may update the portion load index, or may update the load index at a predetermined time interval during drive of the engine 4. The time from the start of the engine 4 and the stop of the engine 4 may be used as the period determined in advance.

The load index only needs to be a value that corresponds to the accumulation degree (degree of fatigue) of the load in the entirety of the vehicle 1 or each portion of the vehicle 1. The unit of the load index is not limited in particular. For example, the load index may be expressed as the number of times a load having not less than a predetermined stress value has occurred, may be expressed as a sum (accumulation) of the product of the stress value and the number of times, or may be expressed as a probability value of replacing a component that corresponds to each portion of the vehicle.

FIG. 8A shows a table for describing the load index corresponding to a portion of the vehicle 1 and a load item. In the present embodiment, a plurality of load items Y1, Y2, . . . Yn, and a plurality of portions Z1, Z2, . . . Zn of the vehicle 1 are determined in advance. In FIG. 8A, as examples, environment load Y1, heat load Y2, repeated fatigue Y3, and impact load Y4 are shown as the load items, and engine drive-system portion Z1, power transmission-system portion Z2, and damping-system portion Z3 are shown as the portions. One load index corresponding to one portion and one load item is stored in the storage 42. In the description below, a category corresponding to one portion and one load item will be referred to as a "load category".

Each of the plurality of load items determined in advance indicates a type of load. For example, the plurality of load items determined in advance include "environment load", "heat load", "repeated fatigue", "impact load", and the like.

The "environment load" is a load (strength reduction) of each portion received from the ambient environment of the vehicle 1 or a change thereof. For example, the ambient environment of the vehicle 1 or a change thereof includes: water or a rugged road surface to which the vehicle 1 is subjected; air temperature around the vehicle 1 and a change thereof; and the like. Other than these, a load due to dust on a desert road surface, a load due to splash of water at the time of passing a stream or a puddle on a road surface in a forest, a load due to loaded objects for farm work, and the like are conceivable.

The "heat load" is a load (strength reduction) of a certain portion due to heat generated at the portion or heat received by the portion from outside.

The "repeated fatigue" is the degree of fatigue (strength reduction) of a portion due to repeated reception of a mechanical stress.

The "impact load" is a load (strength reduction) of a portion caused by impact force directly or indirectly received from outside.

The plurality of portions Z1, Z2, . . . Zn determined in advance include "engine drive-system portion", for example. "Engine drive-system portion" further includes "engine", "reducer", "transmission", and the like.

The plurality of portions Z1, Z2, . . . Zn determined in advance include "power transmission-system portion", for example. "Power transmission-system portion" further includes "front drive shaft", "rear drive shaft", "front-wheel differential device", "rear-wheel differential device", "wheel", and the like.

The plurality of portions Z1, Z2, . . . Zn determined in advance include "damping-system portion", for example. "Damping-system portion" further includes "oscillation arm", "shock absorber", "spring", and the like, which are components of the suspension.

The plurality of portions Z1, Z2, . . . Zn determined in advance include "steering-system portion", for example. "Steering-system portion" further includes "steering shaft", "steering joint", "tie rod end", and the like, which are components of the steering mechanism of the steering 8.

The plurality of portions Z1, Z2, . . . Zn determined in advance include "chassis-system portion", for example. "Chassis-system portion" further includes "front frame", "rear frame", "side frame", "cabin frame", "cross frame", "rear gusset frame", "cargo carrier", and the like.

The plurality of portions Z1, Z2, . . . Zn determined in advance include "electric drive portion (electric drive unit)". "Electric drive portion" further includes elements included in an electric drive unit of an electric-motor car, i.e., "motor", "battery", "inverter", and the like. The plurality of portions Z1, Z2, . . . Zn determined in advance include "brake-system portion".

In the present embodiment, the index update section 54 specifies one or more load categories out of a plurality of load categories, on the basis of the specified status category (i.e., the running operation category and the running field category) and a plurality of detection values received by the receiver 43 and the like.

Specifically, the correspondence relationship between the status category (i.e., the running operation category and the running field category) as an input and one or more load categories as an output is stored in advance in the storage 42 of the vehicle ECU 40. The index update section 54 specifies one or more load categories by using the correspondence relationship stored in advance. That is, the storage 42 has stored therein load correspondence information indicating the correspondence relationship between the status category and the load category, and on the basis of this load correspondence information, the index update section 54 specifies a load category corresponding to the status category. The load correspondence information may include a correspondence relationship between the status category, the load category, and detection values of a plurality of sensors received by the receiver 43 and the like. Similar to the status correspondence information, the load correspondence information is created by using data obtained when the vehicle 200 is caused to run.

Then, on the basis of the specified status category and a plurality of detection values, the index update section 54 determines a weighted value (e.g., "1", "3", etc.) for each specified load category. The load correspondence information may include information about the weighted value corresponding to the specified status category and/or the plurality of detection values. For each portion load index corresponding to the specified load category, the index update section 54 updates the portion load index by adding the determined weighted value. When the index update section 54 has specified a plurality of load categories, the weighted values for the specified plurality of load categories may be different from each other.

The update of the load index described above is merely an example. For example, the above-described load items shown in FIG. 8A are merely examples. The plurality of load items determined in advance may include a part or all of the above-described items, and may include an item different from the above-described items. For example, the load items may include an item for removing erroneous signals and erroneous information (e.g., an item for accumulating information that is not classified into any of the above-described load items).

A plurality of load items may not necessarily be determined for each portion of the vehicle 1. That is, although a plurality of portion load indexes are set for each portion of the vehicle 1 in the example shown in FIG. 8A, one portion load index may be set for each portion of the vehicle 1 as shown in FIG. 8B, for example. In this case, the capacity, out of the capacity of the storage, that is used for storing load indexes can be reduced.

For example, as shown in FIG. 8C, each of the plurality of load items determined in advance may indicate the magnitude (load level) of the load. In FIG. 8C, as the load items corresponding to the magnitudes of the load, for example, "load level 1", "load level 2", "load level 3", "load level 4", and the like are shown in ascending order of the level (the level of stress/impact force that has occurred in each portion) of the load. In this case, from the portion load index of each load item, the frequency of the level of load that occurs in the corresponding portion can be known.

For example, the plurality of load items may be items for which maintenance should be performed, or may be items related to maintenance. The items related to maintenance include the types of the loads described with reference to FIG. 8A. For example, in the engine drive-system portion, when the portion load index corresponding to the heat load is high, it is easily recognized that maintenance should preferentially be performed for the portion for which inspection or replacement are necessary due to influence of the heat load. For example, in a suspension-system portion, when the portion load index for the impact load is high, it is easily recognized that the timing of examination of the damper characteristic needs to be advanced. Since the timing of inspection/replacement of each portion of the vehicle 1 can be grasped, a failure state can be easily prevented through inspection. In addition, the timing of inspection/replacement can be easily made appropriate, and the frequency of inspection/replacement can be made appropriate.

The above-described portions of the vehicle are also merely examples. The plurality of portions determined in advance may not necessarily include a part or all of the above-described portions, and may include another portion. The load index may not necessarily include the portion load index. For example, the load index may be an index indicating the accumulation degree of the load in the entirety of the vehicle 1.

(Update of Load Index Through Machine Learning)

For update of the above-described load index, machine learning can be used, for example. This will be described in combination with the description of specifying the status category using machine learning, with reference to FIGS. 9A, 9B, 9C.

Figure 9A:
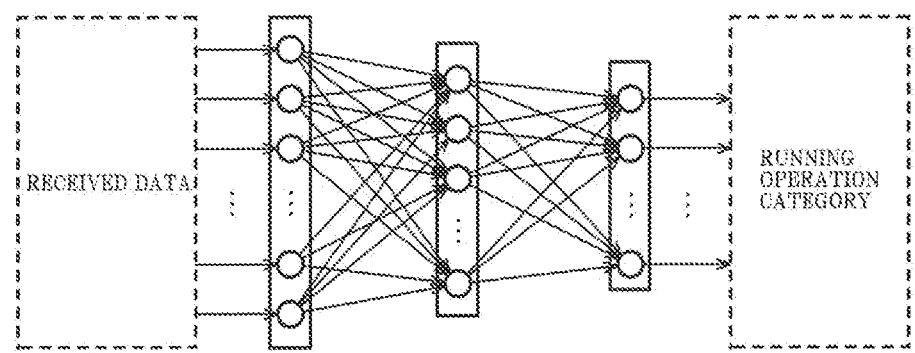
FIG. 9A is a learned neural network that outputs a running operation category on the basis of sensor detection values.

FIG. 9A shows a neural network that includes an input layer and an output layer, and in which input data for the input layer are detection values of a plurality of sensors received by the receiver 43 and the like (hereinafter, also simply referred to as "detection values"), and output data from the output layer is running state category data.

FIG. 9A is a learned neural network (hereinafter, "first status specification model") that outputs a running operation category on the basis of sensor detection values. The first status specification model corresponds to the status correspondence information described above. This learned first status specification model includes an input layer and an output layer, uses a plurality of detection values as input data to the input layer, and outputs running operation category data as output data from the output layer. The learned first status specification model is created through machine learning. In the machine learning, running operation category data and detection values (e.g., detection data of various sensors obtained when the vehicle 200 shown in FIG. 4 has been caused to run) detected by a plurality of sensors when the vehicle 1 has performed running corresponding to the running operation category data, are used as learning data. The running state specification section 52 inputs a plurality of detection values as the input data, to the input layer of the first status specification model, thereby causing one or more running operation categories corresponding to the input data of the first status specification model, to be outputted.

Figure 9B:
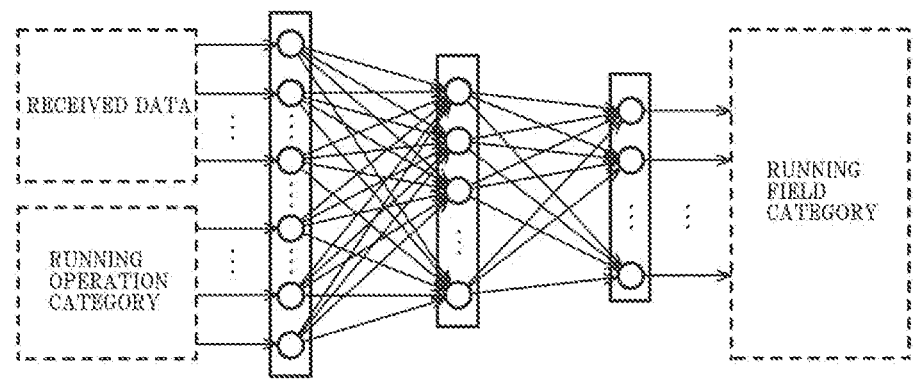
FIG. 9B is a learned neural network that outputs a running field category on the basis of the sensor detection values and the running operation category.

FIG. 9B is a learned neural network (hereinafter, "second status specification model") that outputs a running field category on the basis of the sensor detection values and the running operation category. Similar to the first status specification model, the second status specification model corresponds to the status correspondence information described above. This learned second status specification model includes an input layer and an output layer, uses, as input data to the input layer, a plurality of detection values and running operation category data outputted by the running state specification section 52 using these detection values, and outputs running field category data as output data from the output layer. That is, the input data of this learned second status specification model is the input data and the output data of the learned first status specification model shown in FIG. 9A. The learned second status specification model is created through machine learning. In the machine learning, the running operation category data, the running field category data, and detection values (e.g., detection data of various sensors obtained when the vehicle 200 shown in FIG. 4 has been caused to run) detected by a plurality of sensors when the vehicle 1 has performed running corresponding to the running operation category data in the running field corresponding to the running field category data, are used as learning data. The running field specification section 53 inputs, to the input layer of the second status specification model, the received data and the running operation category data (i.e., the input data and the output data of the learned first status specification model shown in FIG. 9A), thereby causing one or more running field categories corresponding to the input data of the second status specification model, to be outputted.

Figure 9C:
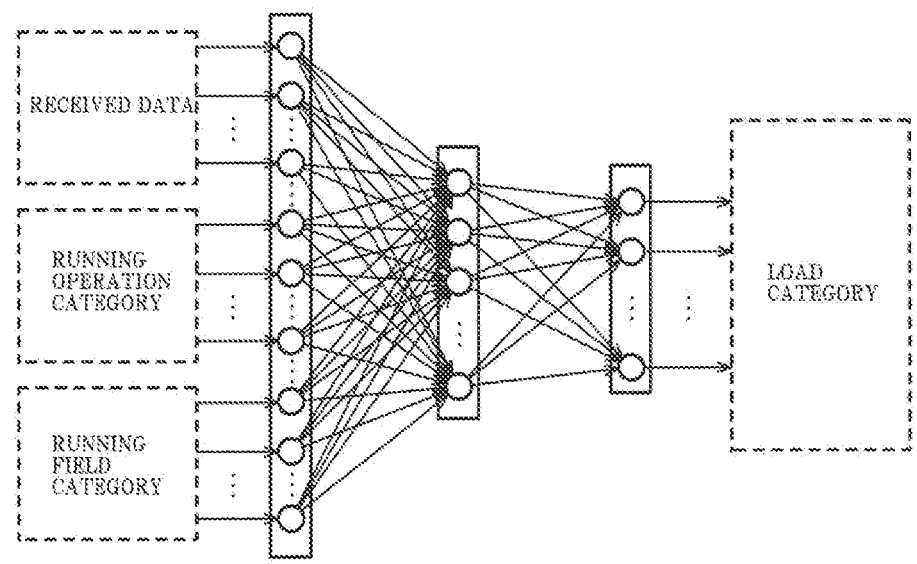
FIG. 9C is a learned neural network that outputs a load category on the basis of the sensor detection values, the running operation category, and the running field category.

FIG. 9C is a learned neural network (hereinafter, "load specification model") that outputs a load category on the basis of the sensor detection values, the running operation category, and the running field category. The load specification model corresponds to the load correspondence information described above. This learned load specification model includes an input layer and an output layer, uses a plurality of detection values, the running operation category data, and the running field category data as input data to the input layer, and outputs load category data as output data from the output layer. That is, the input data to the input layer of the learned load specification model is the input data and the output data of the learned second status specification model shown in FIG. 9B.

The learning data for the load specification model is obtained by performing various running operations in various fields onto the vehicle 1 of which various portions have mounted thereto load detectors such as a strain gauge and the like (corresponding to the above-described vehicle 200). For example, the value of each load detector during running performed according to a certain running operation in a certain running field may be monitored, and a portion where the detection value of the load detector has exceeded a predetermined threshold may be specified as a load category for which the value of the load index is to be updated. In this case, a threshold may be set for each portion. The learned load specification model is created through machine learning. In the machine learning, the running operation category data, the running field category data, detection values (e.g., detection data of various sensors obtained when the vehicle 200 shown in FIG. 4 has been caused to run) of a plurality of sensors generated when the vehicle 1 has performed running corresponding to the running operation category data in the running field corresponding to the running field category data, and the load category data corresponding to the portion determined as having a load, are used as learning data.

The learned load specification model may output, from the output layer, not only the load category that corresponds to one portion and one load item, but also a weighted value that corresponds to the detection value of the strain gauge. In this case, the weighted value, which is the value corresponding to the detection value of the strain gauge, is also included in the learning data for the load specification model. The input data to the input layer of the load specification model may not necessarily be both of the running operation category data and the running field category data, and may be one of them. For example, the learned load specification model may include an input layer and an output layer, may use, as input data to the input layer, a plurality of detection values and status category data indicating the status category specified by the status specification section, and may output load category data as output data from the output layer. In this case, the learning data for the load specification model is the plurality of detection values, the status category data, and the load category data.

The index update section 54 inputs the input data and the output data of the learned second status specification model shown in FIG. 9B, to the input layer of the learned load specification model, thereby causing one or more load categories corresponding to the input data of the learned load specification model to be outputted.

For example, when the vehicle 1 is running at a high speed in a straight running state on a flat running road, on the basis of a plurality of detection values, the running state specification section 52 specifies, "high speed state", "straight running state", and the like by using the first status specification model, and the running field specification section 53 specifies "paved road" by using the second status specification model. Using the load specification model, the index update section 54 specifies a load category corresponding to, for example, a load item "heat load" and a portion "engine drive-system", and determines a weighted value for the load category. For each portion load index corresponding to the specified load category, the index update section 54 adds the determined weighted value (e.g., "1", etc.), to update the portion load index.

With reference back to FIG. 3, the vehicle control section 55 controls on-vehicle devices related to safety of the vehicle 1. For example, the vehicle control section 55 controls a lighting device, a heater, a seat belt sensor, an overturn sensor, and the like. The drive control section 56 controls on-vehicle devices related to drive of the vehicle 1. For example, the drive control section 56 controls switching between two-wheel drive and four-wheel drive, switching of the state of the differential lock, the clutch, and the like. The auxiliary device control section 57 controls auxiliary devices mounted on the vehicle 1. For example, the auxiliary device control section 57 controls a radiator fan and an air conditioner.

The vehicle control section 55, the drive control section 56, and the auxiliary device control section 57 control various devices mounted on the vehicle 1, by using the load indexes updated by the index update section 54. That is, the controller 41 controls the vehicle 1 on the basis of the load indexes. For example, when a load index determined in advance has exceeded a predetermined value, the auxiliary device control section 57 may predict temperature rise of the radiator on the basis of the load index, and drive the radiator fan before the temperature of the radiator rises.

The vehicle control section 55, the drive control section 56, and the auxiliary device control section 57 may control various devices mounted on the vehicle 1, by using status category information. For example, the vehicle control section 55 may perform switching between ON/OFF of the lighting device, on the basis of running operation category information and/or running field category information. The vehicle control section 55, the drive control section 56, and the auxiliary device control section 57 may switch the control of various devices mounted on the vehicle 1 to control that is appropriate for each running field, for example. Specifically, when the status specification section has determined that the vehicle 1 is running on a running road, such as a dune section, that has a high possibility of occurrence of stuck, the vehicle ECU 40 may change two-wheel drive to four-wheel drive, may cancel the differential lock function, or may control the engine 4 or the like so as to suppress rapid acceleration. When the status specification section has determined that the vehicle 1 is running in a rock section that has large unevenness of the road surface, the vehicle ECU 40 may control the suspension 9 so as to suppress the unevenness of the road surface from being transmitted to the vehicle body.

(User Classification)

The user classification section 58 stores, into the storage 42, a frequency specified by the status specification section, for each status category. That is, the user classification section 58 stores, into the storage 42, a frequency specified by the running state specification section 52, for each running state category (in the present example, the running operation category), and stores, into the storage 42, a frequency specified by the running field specification section 53, for each running field category. Here, the specified frequency (frequency information) may be stored in any form as long as the form allows recognition of the frequency of use of the vehicle 1 corresponding to the status category, such as a period specified as corresponding to the status category, the number of times specified, or the like. Further, the user classification section 58 classifies the user of the vehicle 1 to any one of a plurality of user categories, determined in advance, that are related to the status of use of the vehicle 1.

Figure 10A:
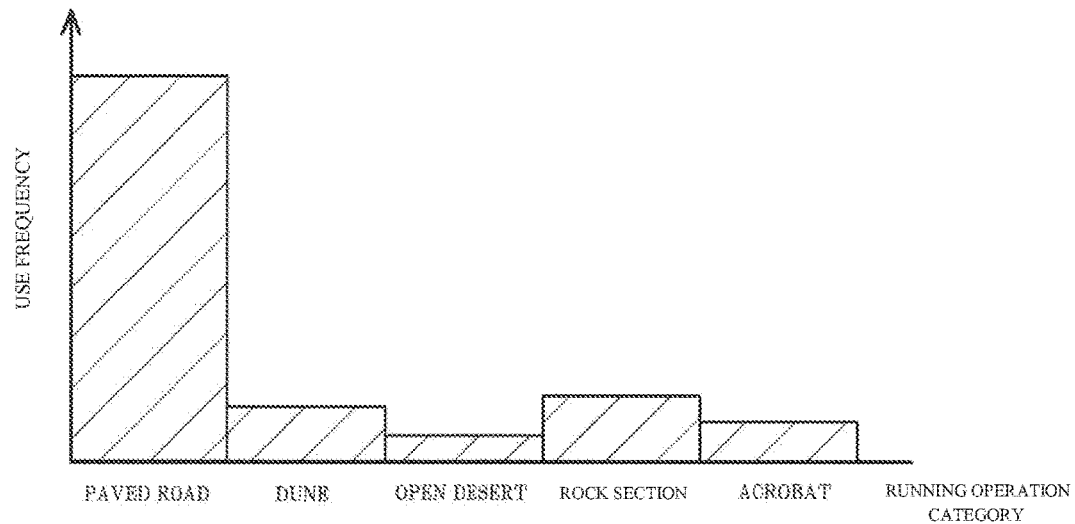
FIG. 10A is an example of a histogram showing a tendency of the status of use of a certain vehicle.

Storing of the frequency and user classification performed by the user classification section 58 are described with reference to FIGS. 10A, 10B. FIG. 10A is a histogram showing, with respect to a certain vehicle, a relationship between the running field and the frequency (use frequency), which have been specified by the running field specification section 53. From FIG. 10A, it is confirmed that the frequency of use on a paved road is greater than the frequency of use in other fields. Thus, the user classification section 58 classifies the user of this vehicle into "first user category", which corresponds to a user category in which use on a paved road is frequent.

Figure 10B:
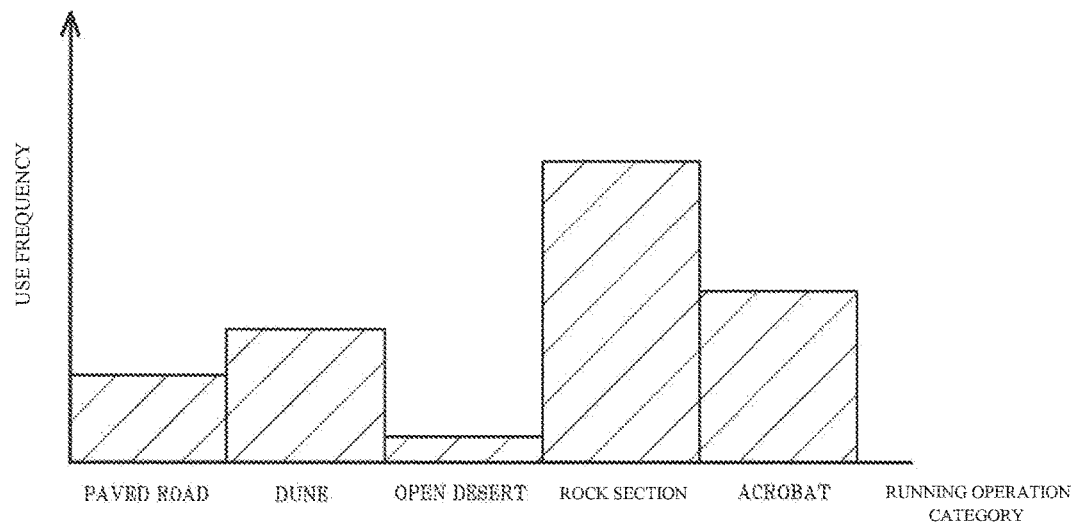
FIG. 10B is an example of a histogram showing a tendency of the status of use of a vehicle different from the vehicle used in FIG. 10A.

FIG. 10B is a histogram showing, with respect to a vehicle different from the vehicle corresponding to FIG. 10A, a relationship between the running field and the frequency (use frequency), which have been specified by the running field specification section 53. From FIG. 10B, it is confirmed that the frequencies of use in other fields such as a rock section, an acrobat field, and the like are greater than the frequency of use on a paved road. Thus, the user classification section 58 classifies the user of this vehicle into "second user category", which corresponds to a user category in which use in the other fields is more frequent than use on a paved road. Since the user of the vehicle 1 is classified in this manner, it is possible to appropriately provide the user with advice for the maintenance timing or the like of the vehicle 1.

(Utilization of Useful Data)

The portion load index for each load category updated by the index update section 54, the use frequency corresponding to the status category, and information classified by the user classification section 58 are stored in the storage 42, and periodically or non-periodically sent as the useful data to the server apparatus 30. The useful data is stored for each user into the storage 32 of the server apparatus 30. The useful data stored in the storage 32 is used for maintenance of the vehicle 1 and designing of a structure of a component of the vehicle 1 by a developer.

For example, on the basis of the load indexes stored in the storage 32, the controller 31 outputs maintenance information for the vehicle 1. The maintenance information is information related to maintenance of the vehicle 1. For example, the maintenance information can include at least one of the timing when a component of the vehicle 1 should be inspected, the timing when the component should be replaced, or the type of the component that should be replaced. For example, when the communication unit 33 of the server apparatus 30 has received a maintenance information request related to a certain vehicle 1, from a terminal apparatus 101 (see FIG. 1) installed in a maintenance company or the like, the controller 31 of the server apparatus 30 outputs maintenance information of the vehicle 1 on the basis of the load indexes stored in the storage 32, i.e., controls the communication unit 31 to send the maintenance information to the terminal apparatus 101. For example, when the communication unit 33 has received, from the terminal apparatus 20 of a user, a maintenance information request related to the vehicle 1 of the user, the controller 31 outputs maintenance information of the vehicle 1, on the basis of the load indexes stored in the storage 32, i.e., controls the communication unit 31 to send the maintenance information to the terminal apparatus 20.

Figure 11:
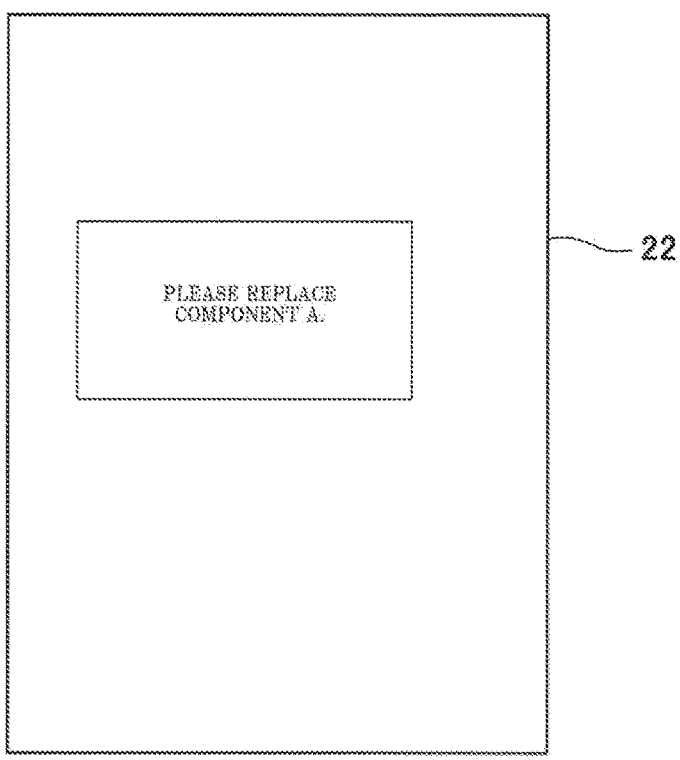
FIG. 11 is an example of a maintenance information presentation screen displayed on a display part of a terminal apparatus.

On the display part of the terminal apparatus 20, 101 having received the maintenance information, information related to the maintenance of the vehicle 1 is displayed. For example, on the basis of the received maintenance information, a maintenance information presentation screen as shown in FIG. 11 (e.g., a screen showing an indication of proposing replacement of a component of the vehicle 1 to the user) is displayed on the display part of the terminal apparatus 20 (in the present example, the touch screen 22).

For example, the controller 31 determines whether or not a load index (including a frequency that specifies a load category) stored in the storage 32 has reached a maintenance reference value determined in advance, thereby determining a timing when the vehicle 1 or a component thereof should be inspected, or whether or not the replacement timing for the component has come.

Figure 12:
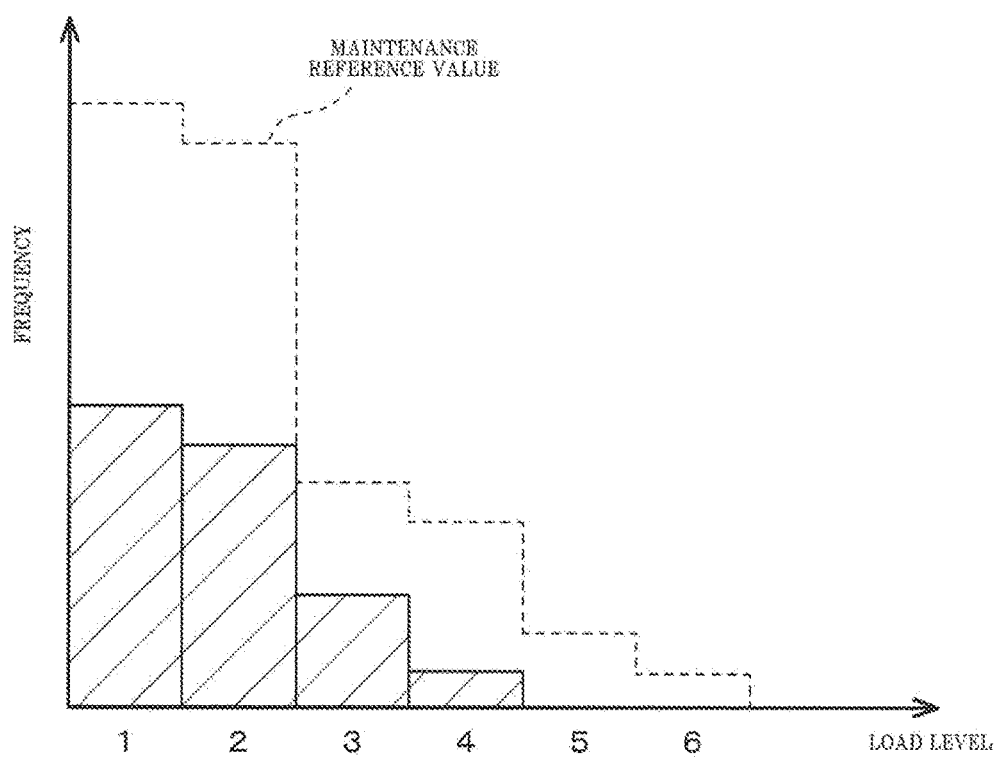
FIG. 12 is a graph showing an example of a relationship between the magnitude of a load having occurred in the vehicle and the frequency of occurrence of the load.

FIG. 12 is a graph indicating an example of a relationship between the magnitude of the load that has occurred in the entirety of the vehicle 1 or a portion of the vehicle 1, and the frequency of the load as a portion load index. For example, FIG. 12 corresponds to a graph of the portion load index for a portion (e.g., engine drive-system portion) shown in FIG. 8C above. A predetermined maintenance reference value is set for each load item (the load level of the present example). In FIG. 12, the maintenance reference value for each load item is indicated by a broken line. The greater the magnitude of load a load item has, the smaller the maintenance reference value is. When any one of the load indexes of the load items has reached a maintenance reference value, the controller 31 sends maintenance information indicating that maintenance is necessary for the vehicle 1, to the terminal apparatus 20 of the user and/or the terminal apparatus 101 of the maintenance company.

In order to allow the user or the maintenance company to visually grasp the degree of fatigue (the accumulation degree of load) of the vehicle 1, the graph shown in FIG. 12, the table shown in FIG. 8A, 8B, 8C, and the like may be displayed on the display part of the terminal apparatus 20, 101, on the basis of the load indexes. For example, in order to allow the user to visually grasp the tendency of the status of use of the vehicle 1 of the user, the graph shown in FIG. 10A, 10B may be displayed, in the terminal apparatus 20 of the user, on the touch screen 22 serving as a display part, on the basis of the frequency specified by the status specification section and stored in the storage 42.

As described above, in the vehicle ECU 40 serving as the state monitoring device according to the present embodiment, the status category indicating the status of use regarding running of the vehicle 1 is specified once, on the basis of detection values obtained from a plurality of sensors. That is, from a local event detected by each of the plurality of sensors, an event related to the entirety of the vehicle 1, i.e., the status of use regarding running of the vehicle 1, is specified. Since the plurality of sensors are used, the status of use regarding running of the vehicle 1, which is an upper-order event as compared to a local event that is detected by each sensor, can be accurately estimated.

Further, in the present embodiment, the load index is updated by using the status category specified by the status specification section. That is, in consideration of the status of use regarding running of the vehicle by the user, the load accumulated in the entirety of the vehicle 1, the load accumulated in each portion of the vehicle 1, and the like are updated as the load index. Accordingly, accumulation of the load for each vehicle 1 can be accurately estimated. In addition, for example, when the tendency of the status of use regarding running of the vehicle by the user specified by the status specification section is known, a future load amount that could be accumulated in each portion of the vehicle 1 due to use of the vehicle 1 in the future, and the life of each portion of the vehicle 1 are easily estimated.

In the present embodiment, the running state specification section 52 specifies one or more running operation categories by using detection values of a plurality of sensors, and the running field specification section 53 specifies one or more running field categories by using detection values of a plurality of sensors. Accordingly, load indexes of the vehicle 1 in consideration of the running operation of the vehicle 1 by the user and the type of the field where the user runs the vehicle 1 can be obtained.

In the present embodiment, the use frequency is stored for each status category indicating the status of use of the vehicle 1. For example, the use frequency can be used as information for classifying the user of the vehicle 1 on the basis of the status of use of the vehicle 1. For example, the maintenance company can appropriately provide the user with advice such as the maintenance timing of the vehicle 1, by using this frequency information. In addition, the developer of the vehicle 1 can utilize this frequency information in designing/development in consideration of the status of use of the vehicle 1.

The use frequency corresponding to the status category is stored for each user in the storage 32 of the server apparatus 30. That is, the running operation and the running field that is used can be grasped for each user, by accessing the server apparatus 30. Accordingly, for example, a person who performs user support can easily provide a user with advice on driving operation, introduction of a related apparatus, and the like, on the basis of the data stored in the server apparatus 30. In addition, since the useful data of a large number of users is stored in the server apparatus 30, the status of use of the vehicle 1 by users can be grasped. Such information related to the status of use is very useful as feedback for product development.

In addition, on the basis of the portion load index for each load category stored in the server apparatus 30, the maintenance company or the like can grasp abnormality in the vehicle 1 and take measures for the user. On the basis of the portion load index for each load category stored in the server apparatus 30, that the vehicle 1 has had an accident (overturn, bumping, fall, etc.) may be determined. The status specification section may perform category classification of statuses that would reach destruction of the vehicle 1, such as decay, buckling, rupture, local damage, and the like, and for each status category therefor, the index update section 54 may set a weighted value (i.e., a value to be added to a past index value).

The vehicle ECU 40 may determine an inspection timing for each portion of the vehicle 1 on the basis of the portion load index for each load category stored in the storage 42. The vehicle ECU 40 may cause the determination result to be displayed on the HMI meter 15.

This facilitates performing maintenance of the vehicle 1 at a timing corresponding to the mechanical fatigue of each portion of the vehicle 1.

In the present embodiment, the data management section 51 records, into the storage 42, detection values of a plurality of sensors received by the receiver 43. The data management section 51 deletes, from the storage 42, at least a part of detection values of a plurality of sensors that have been used in specifying the status category performed by each of the running state specification section 52 and the running field specification section 53 described later. That is, detection values obtained by the plurality of sensors are partially or entirely deleted after having been used in generation of useful data valuable for use, such as the load index for each load category, the use frequency for each status category, and the like. Accordingly, the storage capacity of the storage 42 can be reduced.

<Other Embodiments>

The present invention is not limited to the embodiment described above, and various modification can be made without departing from the gist of the present invention.

Figure 13:
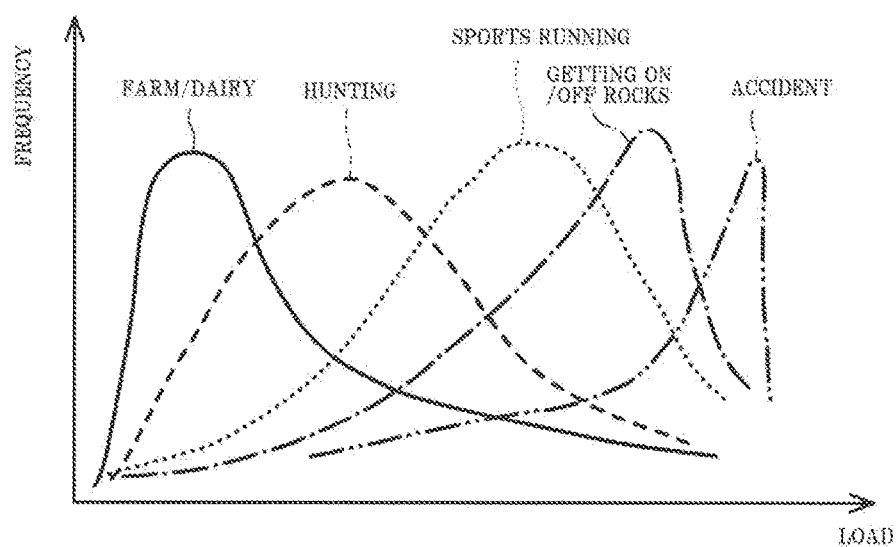
FIG. 13 is an example, different from that in FIG. 7, of a graph showing a relationship between the magnitude of a load having occurred in a certain portion of the vehicle during running of the vehicle, and the frequency of occurrence of the load having the magnitude.
Figure 14:
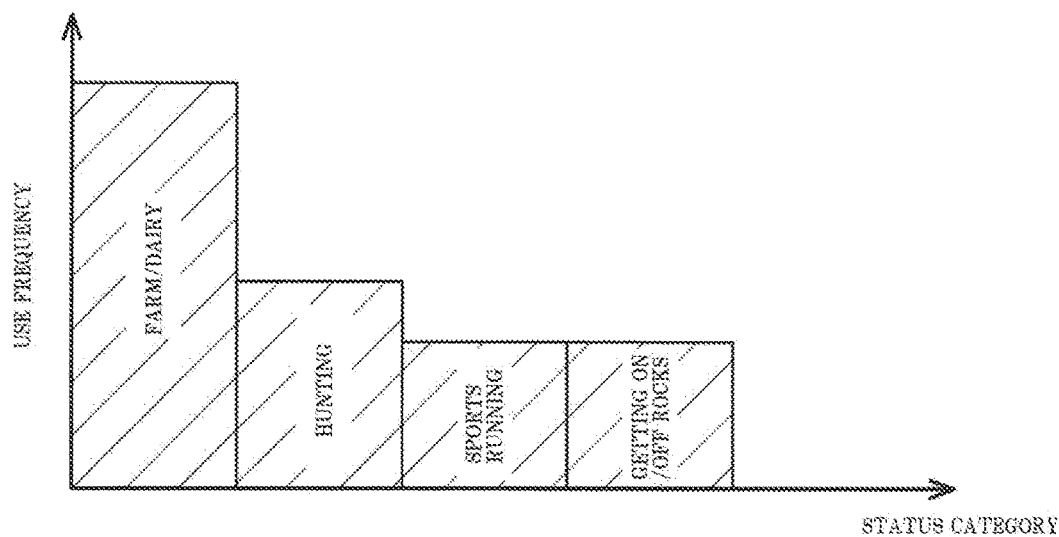
FIG. 14 is an example, different from that in FIG. 10A, 10B, of a histogram showing a tendency of the status of use of the vehicle.

Although the status specification section includes both of the running state specification section 52 and the running field specification section 53, the status specification section may include only one of the running state specification section 52 and the running field specification section 53. The status specification section may include neither the running state specification section 52 nor the running field specification section 53, and may specify a status category of a type different from that of the running operation category and the running field category, for example. For example, FIG. 13 shows an example of a relationship between the magnitude and the frequency of load different from that in FIG. 7, and FIG. 14 shows an example of a histogram showing the tendency of the status of use of the vehicle, which is different from those in FIGS. 10A, 10B. The status specification section may specify one or more status categories out of a plurality of status categories, such as "farm/dairy", "hunting", "sports running", "getting on/off rocks", "accident", and the like shown in FIG. 13. That is, the status specification section of the present disclosure only needs to specify, by using detection values of a plurality of sensors, one or more status categories out of a plurality of status categories determined in advance and each indicating a status of use of the vehicle.

The "storage" may not necessarily be provided in the vehicle ECU 40, and may be provided at a different place in the vehicle 1. The vehicle ECU 40 may include a communication unit for communicating with the terminal apparatus 20. The vehicle ECU 40 may be able to communicate with the server apparatus 30 not via the terminal apparatus 20.

The storage and the calculation unit may be provided in the server apparatus 30. This allows use of information of another vehicle obtained by the server apparatus, machine learning using data accumulated in the server apparatus, and the like, in calculation performed by the calculation unit. Thus, when compared with a case where the storage and the calculation unit are provided in the vehicle, update of a calculation logic for the calculation unit, addition of information to be used in calculation by the calculation unit, and the like can be easily performed. Only one of the storage and the calculation unit may be provided in the server apparatus 30, and the other may be provided in the vehicle 1.

The calculation unit may include the controller 41 of the vehicle ECU 40 of the vehicle 1 and the controller 31 of the server apparatus 30. That is, the storage and the calculation unit may each be implemented by a plurality of separate devices. For example, the controller 41 of the vehicle ECU 40 of the vehicle 1 may include the status specification section and the index update section, and the controller 31 of the server apparatus 30 may include the user classification section 58. In the above embodiment, the state monitoring program is stored in the storage device of the vehicle ECU 40, but the state monitoring program may be stored in a plurality of storages in a distributed manner. For example, a part of the state monitoring program may be stored in a storage provided in the vehicle 1, and the remaining part of the state monitoring program may be stored in the storage of the server apparatus 30. The receiver 43 may not necessarily be an interface that receives detection values from the sensor group 10 via wired communication, and may be a known wireless receiver, for example.

The calculation unit may not necessarily include the index update section. For example, by using detection values of a plurality of sensors, the controller may specify one or more running field categories out of a plurality of running field categories determined in advance and indicating the types of fields related to the running roads on which the vehicle runs, and may store the specified running field categories into the storage. Alternatively, the calculation unit may include a status category specification section and the user classification section, without including the index update section. The status category specification section may specify one status category or may specify a plurality of status categories.

In the above embodiment, the index update section updates the load index stored in the storage 42 on the basis of the specified status category and a plurality of detection values. However, the index update section may update the load index without using the plurality of detection values. For example, the index update section may update the load index on the basis of only the frequency with which the status category has been specified.

In the above embodiment, the index update section updates the load index on the basis of the specified status category. However, the index update section may update the load index by using only detection values from sensors, without using the status category. For example, the calculation unit of the state monitoring device may not necessarily include the status specification section. For example, by using detection value(s) of one or a plurality of sensors mounted on the vehicle, the calculation unit may specify a load category determined in advance and indicating the type of the load having occurred in the vehicle, and may calculate the load index on the basis of the frequency with which the load category has been specified. In this case, using detection value(s) of one or a plurality of sensors mounted on the vehicle, the calculation unit may specify, out of a plurality of load categories determined in advance and indicating the types of loads having occurred in the vehicle, one or more of the load categories, and may calculate, on the basis of the frequency with which each load category has been specified, the load index for each load category.

Here, the type of the load having occurred in the vehicle may include "environment load", "heat load", "repeated fatigue", "impact load", and the like described in the above embodiment, for example. The type of the load having occurred in the vehicle may include the magnitude (load level) of the load. For example, the load category may be a category that indicates that the magnitude of the load having occurred in the vehicle or estimated to have occurred in the vehicle is in a range from a value determined in advance to another value determined in advance. For example, the load category may be a category that indicates that the magnitude of the load having occurred in the vehicle or estimated to have occurred in the vehicle is not less than a value determined in advance.

That is, without specifying a status category, the calculation unit may deduce the type (including the magnitude of the load) of the load having occurred in the vehicle (e.g., as shown in FIGS. 8A to 8C and FIG. 12), and the frequency with which a load category is specified.

The "load having occurred in the vehicle" may not necessarily be only a load having occurred in the vehicle during running of the vehicle, but may include a load having occurred in the vehicle during stop of the vehicle. For example, the "load having occurred in the vehicle" may include an environment load received by the vehicle from the ambient environment of the vehicle during stop of the vehicle, and an impact load received by the vehicle during stop of the vehicle. The state monitoring device may be able to monitor not only the current state of the vehicle, but also the state of the vehicle at a time point in the past.

In addition to the configuration that the calculation unit calculates a load index on the basis of a frequency with which a load category has been specified, the calculation unit may include the status specification section. That is, using the detection values of one or more sensors mounted on the vehicle, the calculation unit may specify, out of a plurality of status categories determined in advance and each indicating a status of use regarding running of the vehicle, one or more of the status categories for each period determined in advance, may specify the load category determined in advance for each of the specified status categories, and may store, into the storage, the frequency with which the load category for each status category has been specified.

Alternatively or in addition, for each portion category, the calculation unit may calculate the portion load index on the basis of the frequency with which the load category has been specified. Here, the load index includes a portion load index set for each of a plurality of portion categories determined in advance and each indicating a portion of the vehicle.

Thus, even in a form in which the load index is not updated on the basis of the status category, when the load index calculated by the calculation unit is stored as the useful data in the storage 32 of the server apparatus 30, the load index can be used for maintenance of a component of the vehicle 1 or for designing of the structure of a component by the developer. That is, similar to the above embodiment, the controller 31 of the server apparatus can output maintenance information of the vehicle 1 on the basis of the load index stored in the storage 32.

The calculation unit may control the vehicle on the basis of the load index. For example, the calculation unit may restrict a part of control of each portion of the vehicle, in accordance with the load index of the vehicle. For example, when a load index has exceeded a predetermined threshold, the modes of the vehicle control section 55, the drive control section 56, and the auxiliary device control section 57 of the vehicle ECU 40 may be switched to modes in which controls on the control targets thereof are partially disabled. For example, when a load index has exceeded a predetermined threshold, the controller 40 of the vehicle ECU 40 described above sends a control command according to the load index to the ECU 11, 12, 13, and the ECU 11 12, 13 may control the control target on the basis of the control command corresponding to the load index.

In the above embodiment, a utility vehicle has been shown as an example of the vehicle. However, the present invention can be applied to vehicles other than the utility vehicle, such as motorcycles, PWCs (personal water craft), riding-type lawn mowers, and the like. In addition, the drive source of the vehicle is not limited in particular. The vehicle may be an engine car or an electric-motor car. The present invention is particularly suitable for off-road running vehicles for which various use statuses are assumed.

From the above description, various modifications and other embodiments of the present invention are apparent to a person skilled in the art. Therefore, the above description should be interpreted as being illustrative only, and is provided for the purpose of teaching the best mode for carrying out the present invention to a person skilled in the art. The details of the structures and/or the functions of the present invention may be substantially modified without departing from the spirit of the present invention.

What is claimed is:

1. A state monitoring device configured to monitor a current state of a vehicle, the state monitoring device comprising:
 a memory configured to have stored therein a load index which is an index indicating an accumulation degree of a load having occurred in the vehicle; and
 at least one processor configured to receive detection values of a plurality of sensors mounted on the vehicle, and configured to perform a predetermined calculation, wherein the at least one processor is further configured to:
 by using the detection values of the plurality of sensors, specify, out of a plurality of status categories determined in advance and each indicating a status of use regarding running of the vehicle, one or more of the status categories, and
 on the basis of each specified status category, update the load index stored in the memory, the vehicle has mounted thereon a vehicle-side communication unit including an antenna or radio circuit and capable of transmitting/receiving information to/from a server-side communication unit including an antenna or radio circuit and mounted on a predetermined server apparatus, the at least one processor includes a first processor of a vehicle-side controller mounted on the vehicle and a second processor of a server-side controller mounted on the server apparatus, the vehicle-side controller controls the vehicle-side communication unit to transmit the load index from the vehicle to the server apparatus, and on the basis of the load index received by the server-side communication unit, the server-side controller outputs maintenance information which is information related to maintenance of the vehicle.

2. The state monitoring device according to claim 1, wherein
the at least one processor updates the load index stored in the memory, on the basis of the specified status category and the plurality of detection values.

3. The state monitoring device according to claim 1, wherein
the plurality of status categories include a plurality of running operation categories each indicating a type of a running operation related to a running operation of the vehicle.

4. The state monitoring device according to claim 1, wherein
the plurality of status categories include a plurality of running field categories each indicating a type of a field related to a running road on which the vehicle runs.

5. The state monitoring device according to claim 1, wherein
the plurality of status categories include a plurality of usage categories each indicating a type of a usage for which the vehicle is used.

6. The state monitoring device according to claim 1, wherein
the plurality of status categories include a plurality of running operation categories each indicating a type of a running operation related to a running operation of the vehicle, and a plurality of running field categories each indicating a type of a field related to a running road on which the vehicle runs, and
the at least one processor is further configured to:
by using the detection values of the plurality of sensors, specify a first status category which is the status category of one type of the running operation category and the running field category, and
by using the detection values of the plurality of sensors and the first status category, specify a second status category which is the status category of another type of the running operation category and the running field category, and
update the load index stored in the memory, on the basis of the detection values of the plurality of sensors, the first status category specified by the at least one processor, and the second status category specified by the at least one processor.

7. The state monitoring device according to claim 1, wherein
the at least one processor stores, for each status category, a frequency with which the status category has been specified, into the memory.

8. The state monitoring device according to claim 7, wherein
the at least one processor updates the load index on the basis of the frequency for each status category.

9. The state monitoring device according to claim 1, wherein the at least one processor is further configured to:
record the detection values of the plurality of sensors into the memory, and to delete, from the memory, at least a part of the detection values of the plurality of sensors used in specifying the status category by the at least one processor.

10. The state monitoring device according to claim 1, wherein
the load index includes a portion load index which is an index indicating an accumulation degree of a load having occurred in each of portions of the vehicle, the portion load index being set for each of a plurality of portion categories that are determined in advance and that respectively indicate the portions of the vehicle, and
the at least one processor is further configured to:
specify one or more portion categories out of the plurality of portion categories, on the basis of the specified status category and the plurality of detection values,
determine the weighted value for each of the specified portion categories, on the basis of the specified status category and the plurality of detection values, and
update, for each portion load index corresponding to the specified portion category, the portion load index by adding the determined weighted value.

11. The state monitoring device according to claim 9, wherein
the plurality of portion categories include at least one of an engine drive-system portion, a power transmission-system portion, a damping-system portion, a steering-system portion, and an electric-drive system portion.

12. The state monitoring device according to claim 1, wherein
the at least one processor controls the vehicle on the basis of the load index.

13. The state monitoring device according to claim 1, wherein
the load index includes a load index set for an electric drive unit including at least one of a motor, a battery, and an inverter.

14. The state monitoring device according to claim 1, wherein
the plurality of sensors include at least two of an engine drive-system sensor, a power transmission-system sensor, and a load-system sensor for a vehicle body.

15. A state monitoring device configured to monitor a current state of a vehicle, the state monitoring device comprising:
a memory configured to have stored therein information of the vehicle; and
at least one processor configured to receive detection values of a plurality of sensors mounted on the vehicle, and configured to perform a predetermined calculation, wherein
by using the detection values of the plurality of sensors, the at least one processor specifies, out of a plurality of running field categories determined in advance and each indicating a type of a field related to a running road on which the vehicle runs, one or more of the running field categories, the vehicle has mounted thereon a vehicle-side communication unit including an antenna or radio circuit and capable of transmitting/receiving information to/from a server-side communication unit including an antenna or radio circuit and mounted on a predetermined server apparatus, the at least one processor includes a first processor of a vehicle-side controller mounted on the vehicle and a second processor of a server-side controller mounted on the server apparatus, the vehicle-side controller controls the vehicle-side communication unit to transmit the one or more specified running field categories from the vehicle to the server apparatus, and on the basis of the one or more specified running field categories received by the server-side communication unit, the server-side controller outputs maintenance information which is information related to maintenance of the vehicle.

16. A state monitoring device configured to monitor a state of a vehicle, the state monitoring device comprising:
a memory configured to have stored therein a load index which is an index indicating an accumulation degree of a load having occurred in the vehicle; and
at least one processor configured to receive a detection value of a sensor mounted on the vehicle, and configured to perform a predetermined calculation, wherein
the at least one processor specifies, by using the detection value of the sensor, a load category determined in advance and indicating a type of a load having occurred in the vehicle, and calculates the load index on the basis of a frequency with which the load category has been specified,
the vehicle has mounted thereon a vehicle-side communication unit including an antenna or radio circuit and capable of transmitting/receiving information to/from a server-side communication unit including an antenna or radio circuit and mounted on a predetermined server apparatus, the at least one processor includes a first processor of a vehicle-side controller mounted on the vehicle and a second processor of a server-side controller mounted on the server apparatus, the vehicle-side controller controls the vehicle-side communication unit to transmit the load index from the vehicle to the server apparatus, and on the basis of the load index received by the server-side communication unit, the server-side controller outputs maintenance information which is information related to maintenance of the vehicle.

17. The state monitoring device according to claim 16, wherein
the at least one processor is further configured to:
specify, by using the detection value of the sensor, out of a plurality of status categories determined in advance and each indicating a status of use regarding running of the vehicle, one or more of the status categories, for each period determined in advance,
specify the load category for each of the specified status categories, and
store, into the memory, the frequency with which the load category for each status category has been specified.

18. The state monitoring device according to claim 16, wherein
the load index includes a portion load index set for each of a plurality of portion categories determined in advance and each indicating a portion of the vehicle, and
the at least one processor calculates the portion load index on the basis of a frequency with which the load category has been specified, for each of the portion categories.

* * * * *